(12) United States Patent
Hurst et al.

(10) Patent No.: US 6,650,319 B1
(45) Date of Patent: Nov. 18, 2003

(54) TOUCH SCREEN BASED TOPOLOGICAL MAPPING WITH RESISTANCE FRAMING DESIGN

(75) Inventors: G. Samuel Hurst, Knoxville, TN (US); Rufus Ritchie, Oak Ridge, TN (US); Donald W. Bouldin, Knoxville, TN (US); Robert Warmack, Knoxville, TN (US)

(73) Assignee: Elo Touchsystems, Inc., Fremont, CA (US)

( * ) Notice: Subject to any disclaimer, the term of this patent is extended or adjusted under 35 U.S.C. 154(b) by 0 days.

(21) Appl. No.: 09/262,909

(22) Filed: Mar. 5, 1999

Related U.S. Application Data

(60) Provisional application No. 60/079,063, filed on Mar. 12, 1998, provisional application No. 60/052,581, filed on Jul. 15, 1997, and provisional application No. 60/029,502, filed on Oct. 29, 1996.

(51) Int. Cl.⁷ .................................. G09G 5/00
(52) U.S. Cl. .................. 345/173; 345/177; 345/179
(58) Field of Search ................. 345/173, 164, 345/177, 174, 179, 176, 178; 178/18.01, 18.02–18.07, 19.01–19.05

(56) References Cited

U.S. PATENT DOCUMENTS

| | | | |
|---|---|---|---|
| 3,591,718 A | 7/1971 | Asano ........................... 178/19 |
| 3,662,105 A | 5/1972 | Hurst et al. .................... 178/18 |
| 3,798,370 A | 3/1974 | Hurst ............................ 178/18 |
| 3,911,215 A | 10/1975 | Hurst et al. .................... 178/18 |
| 4,198,539 A | 4/1980 | Pepper, Jr. .................... 178/18 |
| 4,293,734 A | 10/1981 | Pepper, Jr. .................... 178/18 |
| 4,622,437 A | 11/1986 | Bloom et al. .................. 178/18 |
| 4,623,757 A | 11/1986 | Marino ......................... 178/18 |
| 4,631,355 A | 12/1986 | Federico et al. ............... 178/18 |
| 4,650,926 A | 3/1987 | Nakamura et al. ............. 178/18 |
| 4,661,655 A | 4/1987 | Gibson et al. ................. 178/18 |
| 4,665,283 A * | 5/1987 | Kable et al. ............... 178/18.05 |
| 4,678,869 A | 7/1987 | Kable .......................... 178/19 |
| 4,679,241 A | 7/1987 | Lukis ........................... 382/13 |
| 4,739,299 A * | 4/1988 | Eventoff et al. ................ 341/5 |
| 4,752,655 A | 6/1988 | Tajiri et al. .................... 178/18 |
| 4,794,634 A | 12/1988 | Torihata et al. ............... 379/96 |
| 4,797,514 A | 1/1989 | Talmage, Jr. et al. ......... 178/18 |
| 4,806,709 A | 2/1989 | Evans .......................... 178/19 |
| 4,821,029 A | 4/1989 | Logan et al. ................ 340/712 |
| 4,827,084 A | 5/1989 | Yaniv et al. ................... 178/18 |
| 4,860,372 A | 8/1989 | Kuzunuki et al. ............. 382/13 |
| 4,897,511 A | 1/1990 | Itaya et al. ................... 128/18 |
| 4,980,646 A | 12/1990 | Zemel ........................ 324/716 |
| 5,008,497 A | 4/1991 | Asher .......................... 178/18 |
| 5,157,227 A | 10/1992 | McDermott et al. .......... 178/19 |
| 5,159,159 A | 10/1992 | Asher .......................... 178/18 |
| 5,181,030 A | 1/1993 | Itaya et al. ................... 341/20 |
| 5,220,136 A | 6/1993 | Kent ............................ 178/18 |
| 5,241,139 A | 8/1993 | Gungl et al. .................. 178/18 |
| 5,251,123 A | 10/1993 | Reiffel et al. ............. 364/167.01 |
| 5,335,230 A | 8/1994 | Crooks et al. ................. 371/28 |

(List continued on next page.)

FOREIGN PATENT DOCUMENTS

| | | | |
|---|---|---|---|
| JP | 05019940 | 1/1993 | ............. G06F/3/03 |
| WO | WO 97/34273 | 9/1997 | ............ G08C/21/00 |

*Primary Examiner*—Steven Saras
*Assistant Examiner*—Fritz Alphonse
(74) *Attorney, Agent, or Firm*—Michael Aronoff

(57) ABSTRACT

A new touch screen is based upon the mapping of coordinates from an equipotential space defined by a simple set of screen electrodes to some other, more useful coordinates, such as Cartesian. The key idea is that unique coordinate mapping can be achieved with each sensing pair of electronic readings. A new sensor is described with a band of intermediate conductivity framing the sensor area. This sensor can be used advantageously either as a standalone with uniform equipotential distributions or in connection with the mapping concepts discussed herein with non-uniform distributions.

11 Claims, 23 Drawing Sheets

U.S. PATENT DOCUMENTS

| | | |
|---|---|---|
| 5,365,461 A | 11/1994 | Stein et al. .................. 364/550 |
| 5,412,161 A | 5/1995 | Crooks et al. ................. 178/18 |
| 5,438,162 A | 8/1995 | Thompson et al. ......... 174/52.2 |
| 5,451,724 A | 9/1995 | Nakazawa et al. ............. 178/20 |
| 5,457,289 A | 10/1995 | Huang et al. .................. 178/20 |
| 5,465,103 A | 11/1995 | Yoshioka .................... 345/104 |
| 5,525,764 A | 6/1996 | Junkins et al. ................. 178/18 |
| 5,563,632 A | 10/1996 | Roberts ....................... 345/173 |
| 5,854,450 A * | 12/1998 | Kent ........................ 178/18.04 |
| 5,940,065 A * | 8/1999 | Babb et al. .................. 345/178 |
| 6,163,313 A * | 12/2000 | Aroyan et al. ............... 345/173 |

* cited by examiner

TOUCH SCREEN BASED TOPOLOGICAL MAPPING WITH RESISTANCE FRAMING DESIGN

The present application claims priority from U.S. Provisional Application Ser. No. 60/079,063, filed Mar. 12, 1998 and PCT Application Ser. No. PCT/US97/20001 filed Oct. 29, 1997 which in turn claims priority from U.S. Provisional Application Ser. Nos. 60/029,502 filed Oct. 29, 1996 and 60/052,581 filed Jul. 15, 1997.

Since their introduction in the early 1970s, touch screens have afforded attractive alternatives to keyboards for certain computer applications. In many situations the keyboard and mouse are eliminated, because the touch screen provides the user with a much easier access to the computer. As a consequence, the market has grown to a substantial size, and a continued rapid growth is anticipated. However, current touch screens are difficult to produce, which creates a price barrier limiting growth into many new areas, such as education.

In this disclosure, a new concept is discussed that virtually eliminates design constraints and provides more freedom for the configuration of touch screens. Examples are given to illustrate this new freedom in design parameters. These design concepts provide a basis for producing touch screens at a much lower cost, without sacrificing quality. Furthermore, the creation of new designs for special sensor size, shape, or electrical characteristics is greatly simplified with the concept described herein and reduces research and development costs.

BACKGROUND OF THE INVENTION

A substantial portion of the touch screens produced today are based on the measurement of electrical potentials on substrates that are made of a transparent medium such as glass, coated with an electrically conductive material. Uniform electrical fields must be maintained on the substrate, and these are applied sequentially in the x- and y-directions.

In other words, equally spaced equipotential lines are generated orthogonally in a timed sequence. A voltage (or equivalently, a current related to the local potential of the touch point) measured when the field is in the x-direction is directly proportional to the distance along the x coordinate and is independent of the y coordinate. Conversely, a voltage measured when the field is in the y-direction is directly proportional to the distance along the y coordinate and is independent of the value of x.

According to present designs, resistive touch screens are often mounted on LCD or CRT displays, but perhaps most commonly on CRTs used as computer monitors to use as data input devices. As shown in FIG. 6 a typical monitor 10 will comprise a back case 11 into which is set the CRT. A glass panel 12 with a uniform resistive coating 15 (shown in FIG. 7) such as ITO (indium tin oxide) is placed over the face 14 CRT 13. A polyester cover sheet is tightly suspended over the top of the glass panel, preferably separated from it by small transparent insulating dots 16 as described in Hurst, U.S. Pat. No. 3,911,215 which is incorporated herein by reference. The cover sheet 17 has a conductive coating on the inside and a hard durable coating 18 on the outer side. A more detailed view of the layers of the touch screen is shown in FIG. 7, with a bezel 19.

A simple computer or controller 20 (shown in FIG. 8) is used to alternate a voltage across the resistive surface of the glass in the X and Y directions. When a touch on the cover sheet causes the inner conductive coating to make electrical contact with the resistive coating on the glass, an electrical circuit connected to the controller digitizes these voltages or equipotentials and transmits them to the associated main computer 21 for processing. As shown in FIGS. 8A and 8B, the controller 20 may be mounted internal to the monitor 10 or in a slot within the associated main computer 21.

In practice, the implementation of these concepts, as disclosed in the Patent of Hurst (U.S. Pat. No. 3,798,370, March, 1974) leads to the production of touch screens of excellent quality. Yet production costs are high, because of three factors:

1) The substrate must have very uniform conductivity. Conductive materials are applied to a substrate (usually glass) in elaborate coating chambers. When a large substrate is being prepared, the chamber must be still larger, and even then, several sources must be used to cover the substrate uniformly. Some of these coated substrates do not meet specifications and have to be rejected.
2) A resistor divider network must be added to maintain straight equipotentials by eliminating edge effects associated with the field switching matrix. This has independent quality demands that further add to production costs and increase rejection rates.
3) Finally, rigorous testing must be done on the substrate itself and on each completed screen. These statistical quality-control tests are expensive and are directly associated with the problem of maintaining accurate equipotentials.

Currently, design changes requires considerable retooling. However, retooling costs and delays are considerably reduced by using the new concepts in the present invention. These concepts, to be explained, will reduce all of the cost factors and, at the same time, provide much more flexibility in the design of sensors of the required shape, size, and electrical specifications.

SUMMARY OF THE INVENTION

It is therefore a purpose of the invention to provide improved touch screen production by enhancing screen yield through an inherent tolerance for individual and lot variances. It is a further object of the invention to permit simplified manufacture requirements for touch screens including less-demanding conductive-coating application; fewer and much simpler electrodes—only four, for example, or even a simple resistance framing design; with no divider resistors required. It is yet another purpose of the invention to provide compatibility with current manufacture of analog-to-digital electronics, and calibration/testing procedures. It is yet another object of the invention to permit manufacture at low additional cost, more than offset by savings in screen manufacture. It is another purpose of the invention to permit liberated design of touch screens with changes readily implemented to accommodate new screen configurations.

DETAILED DESCRIPTION OF THE INVENTION

For the purpose of describing the invention, it is best to define a space in terms of electric equipotentials. In principle, coordinate mapping can be obtained using any set of electrodes that generates monotonic equipotentials. In terms of topology, this means that the space must be defined with equipotentials that are topologically equivalent to the Cartesian space to be mapped to. For a surface, lines drawn at the same potential in the space between the opposing sets of electrodes are called equipotential lines. Full two-dimensional mapping on that surface can be achieved using two sets of monotonic equipotentials in two different directions. The potential lines need not be straight or uniform, but the key idea is that any point on that surface must have a unique value for the pair of potentials at that point. In topology, this uniqueness is expressed in terms of "topological equivalence;" two surfaces are topologically equivalent when all points on one surface can be mapped to unique points on the other surface.

Figure 1A:
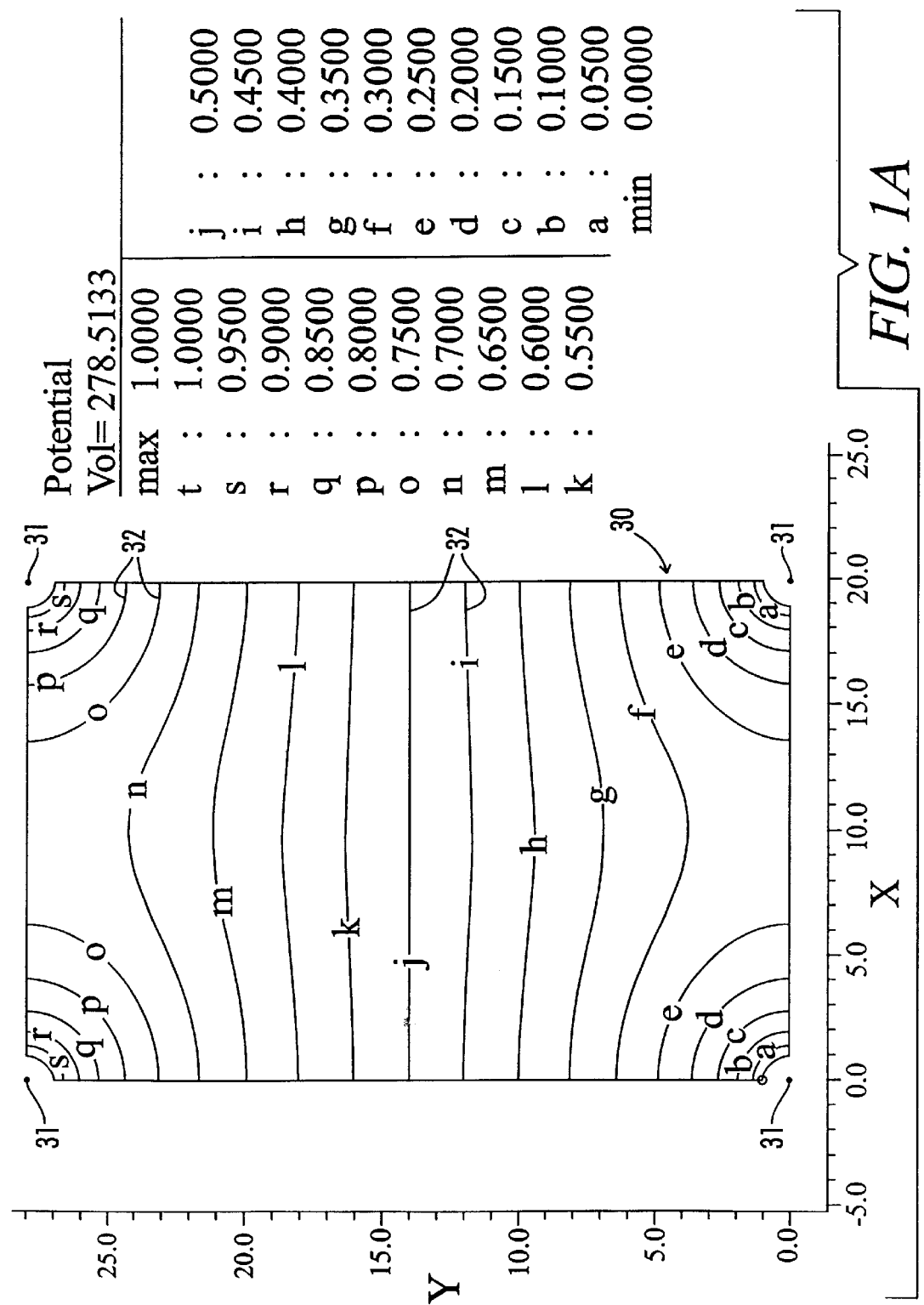
FIG. 1A shows a contour plot of theoretical equipotentials in the y-direction on a touch screen sensor according to the present invention with four electrodes and non-linear equipotential lines.
Figure 1B:
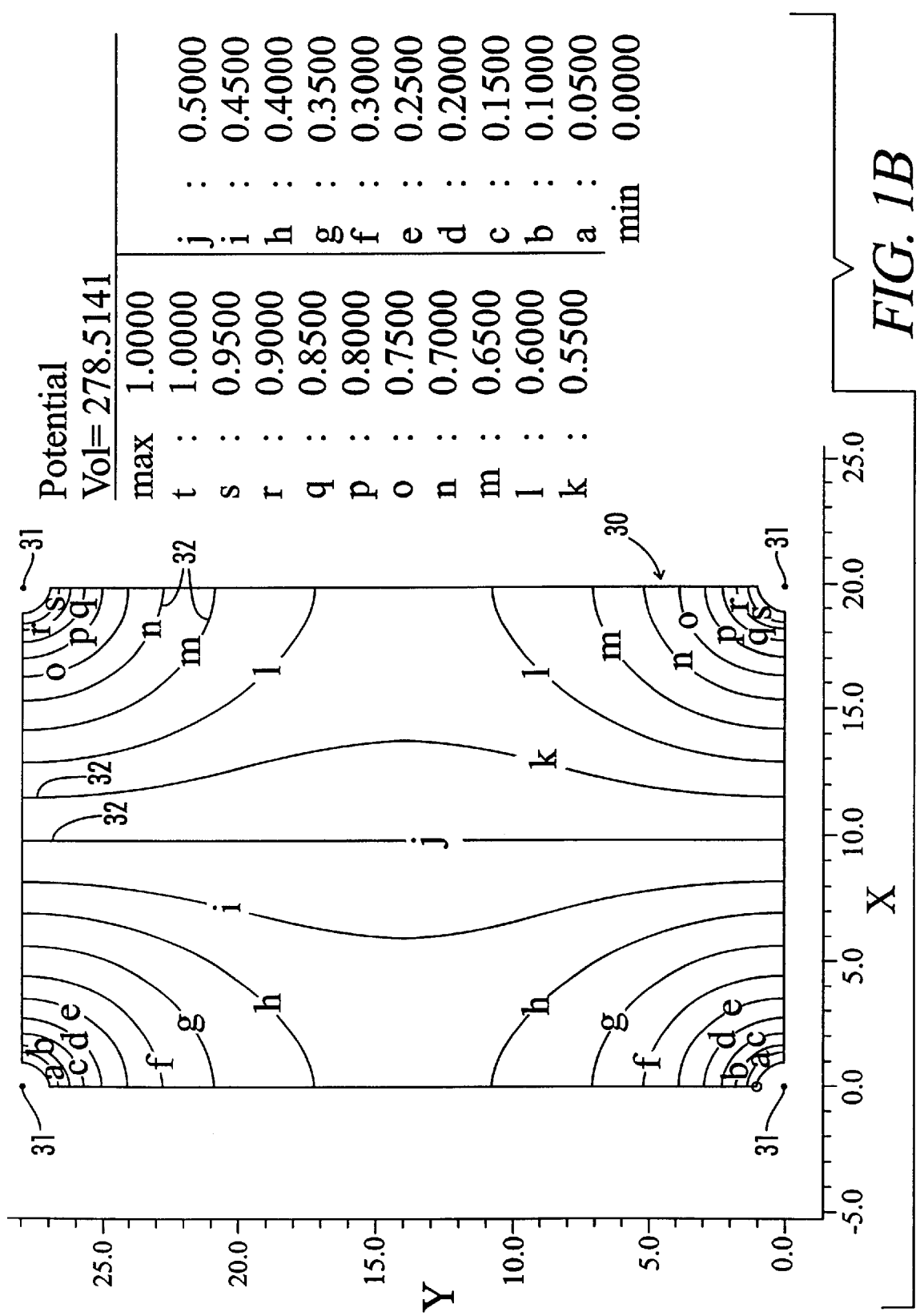
FIG. 1B shows a contour plot of theoretical equipotentials in the x-direction on a touch screen sensor according to the present invention with four electrodes and non-linear equipotential lines.

Consider, as diagramed in FIGS. 1A and 1B, a two-dimensional surface 30 that is slightly conductive (or, if you prefer, resistive). A very simple geometry with electrodes 31 attached at each of the four corners can be used to illustrate the basic idea. The exact solution for the potential distributions also provided by Laplace's equation as described below. The usual Cartesian space with x-y coordinates can be mapped by two sets of equipotential lines. One of these sets is obtained when a source of electrical potential such as a battery is applied so as to produce an electrical field generally in the y-direction; equipotentials 32 will run generally in the x-direction (FIG. 1A). When the battery is switched to produce a field generally in the x-direction, equipotentials will run generally in the y-direction (FIG. 1B) The word "generally" is used to stress that nowhere are we assuming uniform fields or equipotentials that run parallel to the x- or y-axes. There is distortion (i.e., the equipotentials are not evenly spaced nor are they parallel to the x-and y-axes), since the electrodes are not at all designed to produce uniform fields, and because the electrical conductivity need not be uniform. Obviously, one set of equipotentials need not be orthogonal to a second set when the voltage source is switched from one direction to another.

The notation V(X,y) is used to mean an equipotential when the voltage supply is connected in the x-direction (FIG. 1B), and the lower-case y is shown to indicate that the equipotential also depends on y, due to the distortion. Similarly, V(Y,x) is used for the equipotentials when the voltage supply is connected in the y-direction (FIG. 1A). Near the center of the screen, there is little or no distortion and it is possible to approximate V(X,y) with V(X), i.e., the equipotential in x is essentially independent of y. Of course, a similar statement could be made of the complementary case, V(Y,x). Near the edges of the sensor there is appreciable distortion, which is permitted here, but would be fatal to the performance of conventional touch screens that require uniform potential distributions.

Because of this interdependence of potential upon both x and y, a single potential measurement cannot uniquely specify either x or y. Consequently, it is no longer possible to measure x independent of y, and y independent of x. This must be given up in the present considerations; however, the pair of potentials [V(X,y), V(Y,x)] uniquely transforms to a point P(x,y) in the Cartesian space, under certain conditions. It is this uniqueness that is important to the invention. With this uniqueness, operations can be found that will map the pair [V(X,y), V(Y,x)] to a unique point P(x,y) in Cartesian space.

Certain conditions are required for this uniqueness. One condition is that the field (i.e., potential gradient or change in potential) be continuous over the entire area in each of the directions of application. A related condition is that the field has no singularities over an appreciable area of the substrate. These field conditions imply that the equipotentials must increase continuously in the direction of the applied potential. These conditions, in turn, impose some practical conditions on the substrate, which is often prepared by vapor deposition. The coating need not be uniform, but it must be continuous without isolated areas of no conductivity. Further, the coating must not be so heavy in the other areas so as to substantially "short" them. Both of these conditions are much more easily satisfied than is required for present touch screens. There is another condition related to how much variation in the field we can allow in practice. A weak-field region presents a problem for precisely determining the sensed point. Finally, in order to make precise determinations of the Cartesian coordinates, the equipotentials must substantially intersect over all of the working area of the screen.

Many designs with alternative electrode placement can be conceived. However, one of the simplest designs is that shown in FIGS. 1A and 1B. This configuration consists of four electrodes in the form of quarter-circles located at the corners of a rectangular, uniformly conducting sensor. FIG. 1A represents equipotentials in a rectangular sensor when a unit potential difference is applied in the y-direction between the top and bottom electrode pairs. FIG. 1B shows corresponding data when the potential difference is maintained in the x-direction between the side pairs of electrodes.

It should be noted that although the potential near each electrode departs from uniformity in both figures, a pair of potential readings (corresponding to the two different directions of applied potential) at an arbitrary point on the sensor will clearly yield a unique answer, over most of the sensor area. The system of electronic interpretation visualized here allows mapping of these two potential readings to the coordinates of the point at which the measurements were made. Note that the equipotentials of one set need not be orthogonal to those of a second set when the voltage source is switched from one direction to another.

As discussed above, certain conditions are required for the unique mapping of the pair [V(X,y), V(Y,x)] to a point in Cartesian space. The most important condition is that there must be some crossing of the complementary equipotentials, as discussed in the introduction.

In practice, there is a finite precision given by the electronic analog and digital noise. Therefore, the lines of equipotential become bands within which the change in potential measured cannot be discerned. For polarization in both directions, the overlap area of bands gives an uncertainty in the coordinate mapping.

MAPPING OPTIONS

Some, but not all, applications of touch screens based on the potential pairs will require mapping to a Cartesian coordinate system. There are several possibilities to fit any number of applications.

Direct address. In principle it is possible to communicate with an attached computer or cash register without ever leaving the potential-pair space. However, this would not appeal to users who have been brought up in a Cartesian world, and as "Cartesianites" would feel uncomfortable working with, for example, curved menu boxes. This would be the least demanding, since little technology would be required for implementation. This possibility is given mainly to set the stage for more serious mapping options.

Complete mapping. This term applies to cases where it is elected to store each point in a built-in table (i.e., memory for each pixel required). This option would use an auxiliary mapping device with enough memory to define the required number of pixels in the x-y plane. The device would store a large array of pre-defined x,y points corresponding to the field of points in the [V(X,y), V(Y,x)] space, so that a "look-up" table (LUT) could be used in the mapping. In this case, the LUT would be a device or process whereby a potential pair, [V(X,y), V(Y,x)], in suitable digital form would be used to locate in a two-dimensional table the corresponding real-space coordinate pair, (x,y), also in digital form. Resolutions of 128×128 to 1024×1024 would require 32 Kbytes to 4 Mbytes of LUT memory, respectively. This option is becoming increasingly attractive as computer chips drop in price.

Interpolative mapping. In practice, intermediate points between two tabulated points can be determined by interpolation. This option would store calibration points and fill in all intermediate points by interpolation. In a sense, interpolative mapping can be regarded as a processor-based method of achieving complete mapping that uses less memory than a complete LUT. In this connection, a mathematical solution of the boundary-value problem would be very powerful, especially if the solution is able to adjust to substrate irregularities. For instance, a math chip or programmed processor could be used to solve a partial differential equation known as Laplace's equation, and the interpolation between points could be based on this solution. It is anticipated that the solution to the partial differential equation would automatically take into account non-uniformity in the substrate, and thus serve as an accurate interpolation independent of substrate characteristics.

Even simpler would be a modest resolution LUT (say, 256×256 points) and a linear-interpolation algorithm. For example, a pair of 12-bit (4096) potential readings could be trimmed to 8 bits (256) before interpretation by the LUT. The 4-bit remainders would then be used for linear interpolation between adjacent points in the LUT. The resultant answer would yield complete mapping at 12-bit (4096) resolution. The code required for this is very small, so that even a modest-sized LUT with a simple programmed processor would be used.

Boundary mapping. In this case, an active area, such as a menu box, can be defined without complete, one-to-one mapping. For instance, straight-sided boxes (or other shapes) could be defined by their boundaries, stored as potential pairs. A simple logic could be employed to locate the potential pair, [V(X,y), V(Y,x)], within or outside the boxes. Typically a limited number of boxes are used in menu selection, so that the memory required would be greatly reduced from complete mapping. Perhaps a small LUT could be used that define areas where this boundary analysis is to be made.

BOUNDARY MAPPING OF MENU BOXES

A common end-use of the touch screen is the so-called menu application. Choices are made by the user simply by touching menu items typically enclosed by rectangular boundaries. In this case it is possible to map only around the perimeter (boundary) of the box. Define the points around the perimeter of the rectangular box, in terms of the pairs [V(X,y), V(Y,x)] and use an electronic test to determine if the point in the measurement space is within the rectangular box.

Figure 5A:
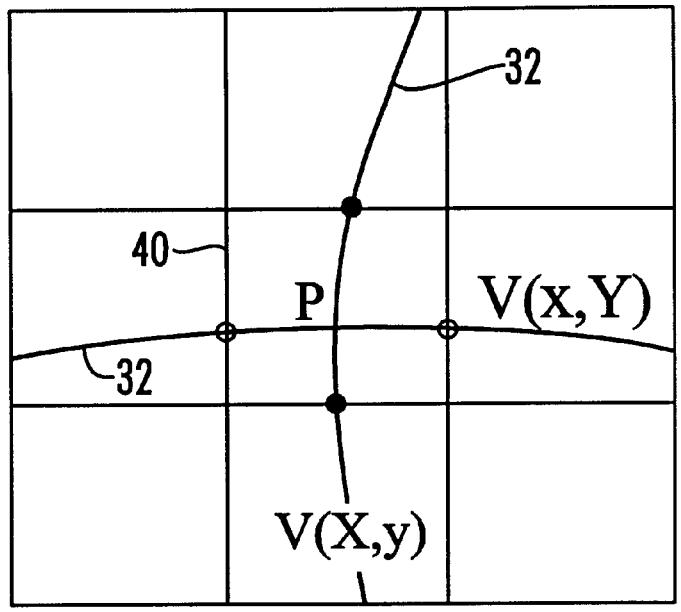
FIG. 5A illustrates the location of cells by the process of border mapping in the usual case.
Figure 5B:
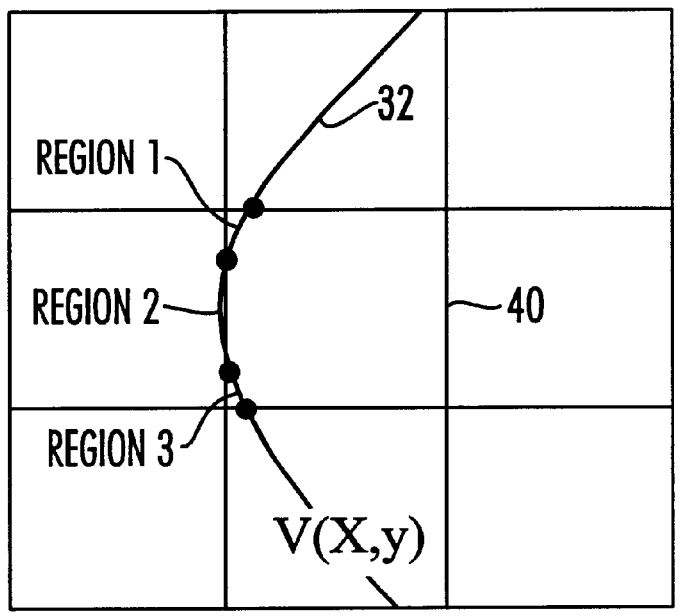
FIG. 5B illustrates the special condition when the severe bulging of an equipotential causes a given equipotential to intersect a rectangular function box at four points.
Figure 6:
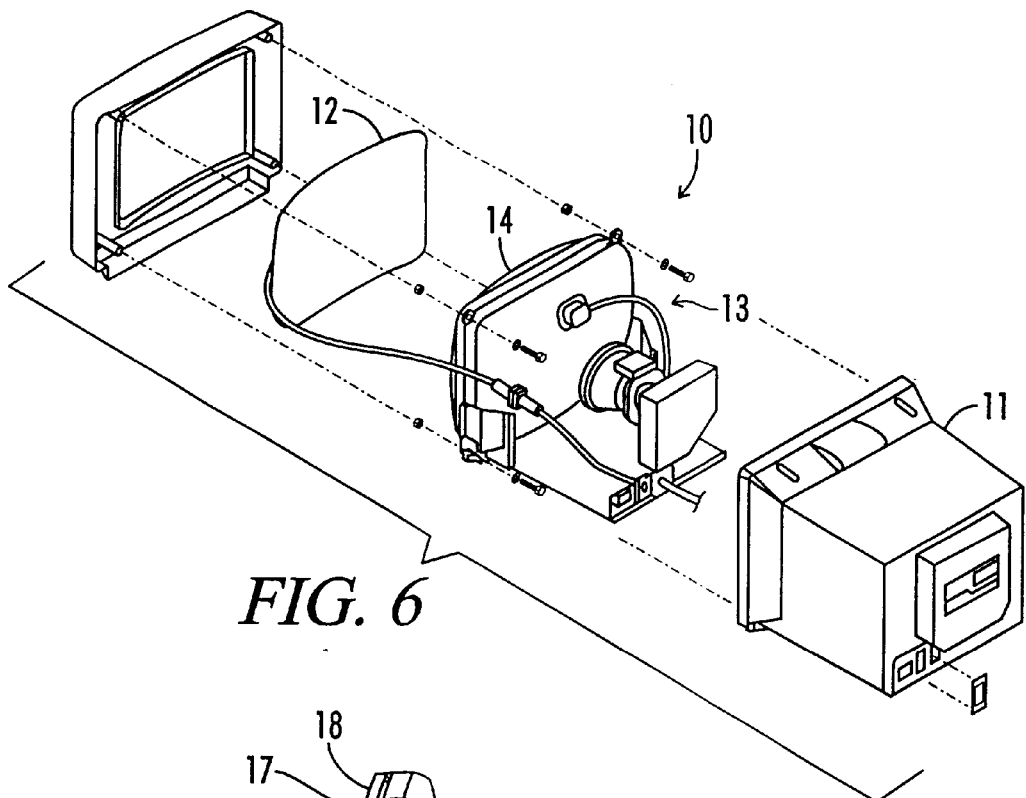
FIG. 6 illustrates a typical monitor with touch screen input device.
Figure 7:
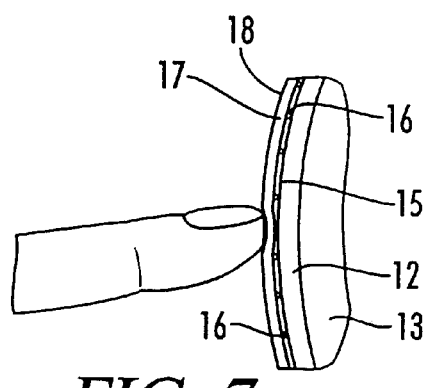
FIG. 7 illustrates a detailed view of the layers of a resistive touch screen.
Figure 8A:
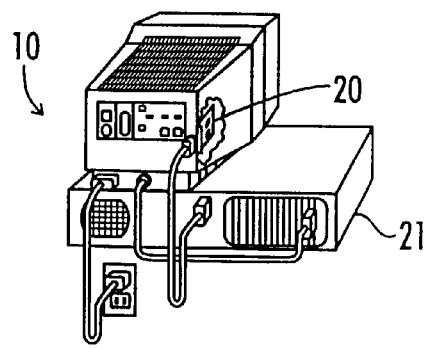
FIG. 8A shows a representative touch screen monitor with an internal controller.
Figure 8B:
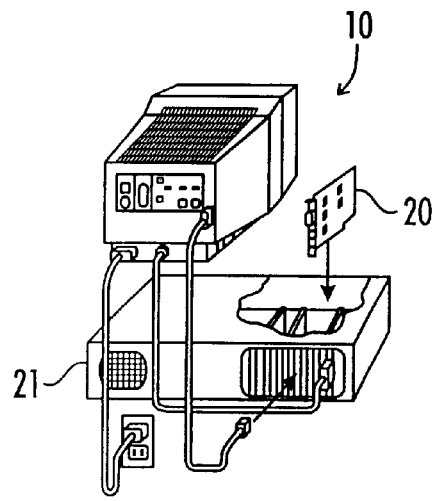
FIG. 8B shows a representative touch screen monitor with an external controller.

Expanding on the discussion of this option, FIGS. 5A and 5B illustrate the definition of a rectangular box 40 by means of the measured coordinates based on equipotential pairs. This illustration makes it clear that any pair of potentials measured within the box so defined can be assigned uniquely to the box defined by Cartesian coordinates.

An electronic test determines if the measurement space is within the selection area. In the box illustration of FIG. 5A, note that its entire perimeter could be defined with as few as eight measurements of the potential pairs at the indicated Cartesian points. From the three measurements on each edge, a polynomial of, for example, three terms (e.g., $a+bz+cz^2$) could be fitted to both of the measured members for each of the potential pairs, giving two sets of coefficients in the polynomial. Thus, for the four sides only eight sets of these coefficients (a total of 24 coefficients) are needed to completely specify (with good accuracy) the perimeter of the box. Assuming that each coefficient is an eight-bit byte, only 192 bits, or 24 bytes, of storage space is required.

Having defined the box, where the measurement space is now made to conform to the rectangular Cartesian space, a test can be described to see if the measured point is within the Cartesian space. Imagine, as in FIG. 5A, that either of the two potentials measured at a particular point, P, is on an equipotential 32 that intersects the box at two places. Neither of the two equipotentials 32 alone will select a particular Cartesian box, as shown. However, the pair of equipotentials 32 will intersect only at one point and therefore in a particular box. Thus, a boundary analysis, by the procedure that searches all boxes and finds the four points on the perimeter of a box, will select that particular box. A box is selected by finding just two potentials on its perimeter, provided that the two potentials are complements; i.e., one value belongs to V(X,y) and one to V(Y,x). With modern data processing, this search procedure is routine. For instance, the two potentials measured could first be stored in a register until the boundary analysis described above is completed.

In the case of severe bulging of an equipotential 32 shown in FIG. 5B, it is possible that a given equipotential will intersect a box at four places rather than two. This could produce some ambiguity in assigning a pair of potentials to a box. However, this can be avoided by applying a special test. In the above paragraph, a regular test is described that will be by far more common than the special test. In the special test a concept of complementary potentials is employed. At every point in the working area, there is an intersection of two equipotentials. The discussion will focus on just one of these, and the other will be considered its complement. At each of the places where one equipotential 32 crosses the boundary of a box 40 there will be a value for the corresponding complement. The special test looks at the complement in potential actually measured and tests to see that its magnitude lies intermediate to the complements created at the boundary crossings. In the case where there are four crossings this test could be applied and in three regions of the sensor, as illustrated in FIG. 5B.

The special test just described removes any possible ambiguity due to four crossings of one equipotential on the box boundary. However, a more attractive alternative could be simply to electronically abort any touch that results in four crossings. This would create very small inactive areas, which would go unnoticed in most applications. This test procedure is not restricted to rectangles. For instance, the control "box" could be a circle or an arbitrary enclosure. However, for complex figures, boundaries or perimeters, definition becomes correspondingly more complex.

And, of course, the special test can be avoided altogether by using the concept of "cells" that are small enough to eliminate multiple crossings. An extra cell can be added wherever there are multiple boundary crossings, guided by principles of symmetry. For instance, in FIG. 5B, the box containing Region 2 could be divided into two cells by the addition of a horizontal boundary line. A menu box would then be configured from any number of cells. Reasonable sensor design to avoid excessive curvature of equipotential lines would greatly reduce the number of cells needed, perhaps to one per menu box.

MATHEMATICAL SOLUTIONS

The electrical potential distribution of a conducting sheet is determined by the configuration of electrodes, the potentials applied to them, and the conductivity, 6, of the sheet. In general $\delta=\delta(x,y)$ is a function of position. We further assume that the conductivity is isotropic (but not necessarily uniform). Then if V(x,y) is the electric potential at (x,y), the resulting current j(x,y) is given by:

$$j(x,y)=\delta(x,y)\nabla V(x,y), \tag{A1}$$

We assume that charge cannot accumulate at any point, hence:

$$\nabla \cdot j(x,y)=0, \tag{A2}$$

and from substitution of Eq. (A1) into Eq. (A2):

$$\nabla \cdot [\delta(x,y)\nabla V(x,y)]=0 \tag{A3}$$

This is the equation that is used to solve for V(x,y), subject to a boundary condition for a given distribution of applied electrical potential on the electrodes. The electrodes may be of any shape, including circular spots 31 as shown in the illustrations of FIG. 1A and FIG. 1B. In that case, the sheet is 20×28 cm with 1-cm radius circular electrodes centered on the four corners of sheet with uniform conductivity.

The method of images is often used to satisfy equation A3 for a given set of electrodes and boundaries. It is based on the fact that, away from actual sources, and for $\delta$ equal to constant (k) in an infinite medium, equation A3 becomes Laplace's equation and is exactly satisfied; thus one may be able to distribute sources outside of the physical region in such a way that the boundary conditions are satisfied and that requisite real currents are well-represented. Many such solutions have been found in the mathematical theory of electrostatics. In preliminary testing an infinite rectangular grid of infinitely long current sources and sinks has been constructed to approximate the potential in a rectangular sensor with circular electrodes. The boundary conditions at the edges of the sensor, viz., that electric lines of force shall be parallel with the boundary, are well satisfied in this model.

Alternatively, equation A3 may be solved directly by numerical means in order to represent real sensors with complicated boundaries and electrodes. Various techniques for solving equation A3 have been developed extensively over many years. For example, the conformal transformation method is useful for problems in two dimensions with boundaries that are fairly simple. A brief discussion is given in "Mathematical Methods of Physics" by J. Mathews and R. L. Walker, Benjamin, N.Y., 1964. Relaxation methods are more generally useful for complex geometries and have been applied to the numerical solution of many different problems in physics and engineering. A standard reference is "Relaxation Methods in Theoretical Physics" by R. V. Southwell, 1946, while more recent work that is designed to take advantage of the capabilities of modern computers is described, e.g., in "The Finite Element Method" by O. C. Zienkiewicz and R. L. Taylor, McGraw Hill, 1987, and in "The Finite Element Method in Electromagnetics" by J. -M. Jin, Wiley, 1993.

Figure 2:
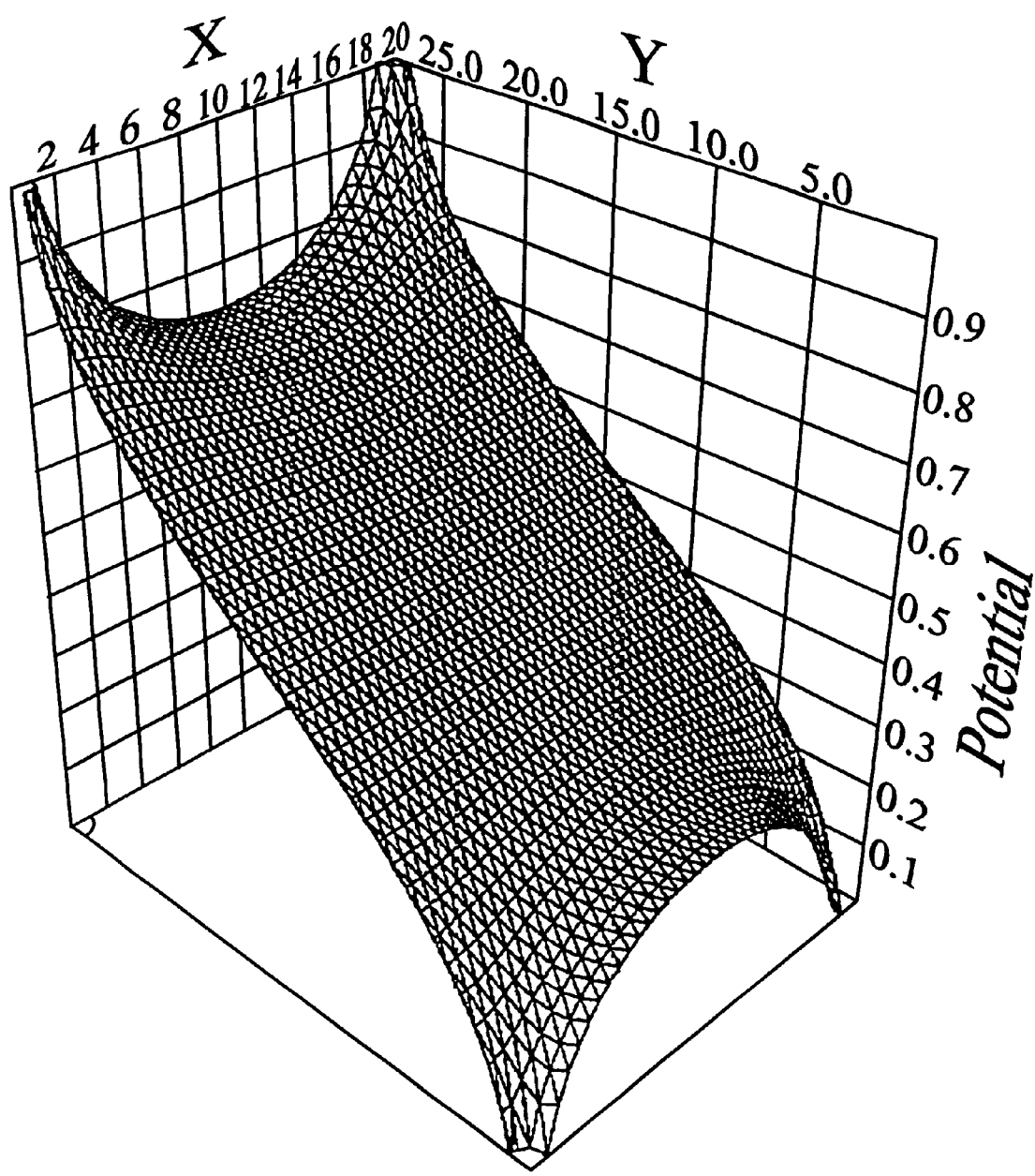
FIG. 2 shows a three-dimensional plot of the potential distribution in the sensor with the configuration shown in FIGS. 1A and B.
Figure 3:
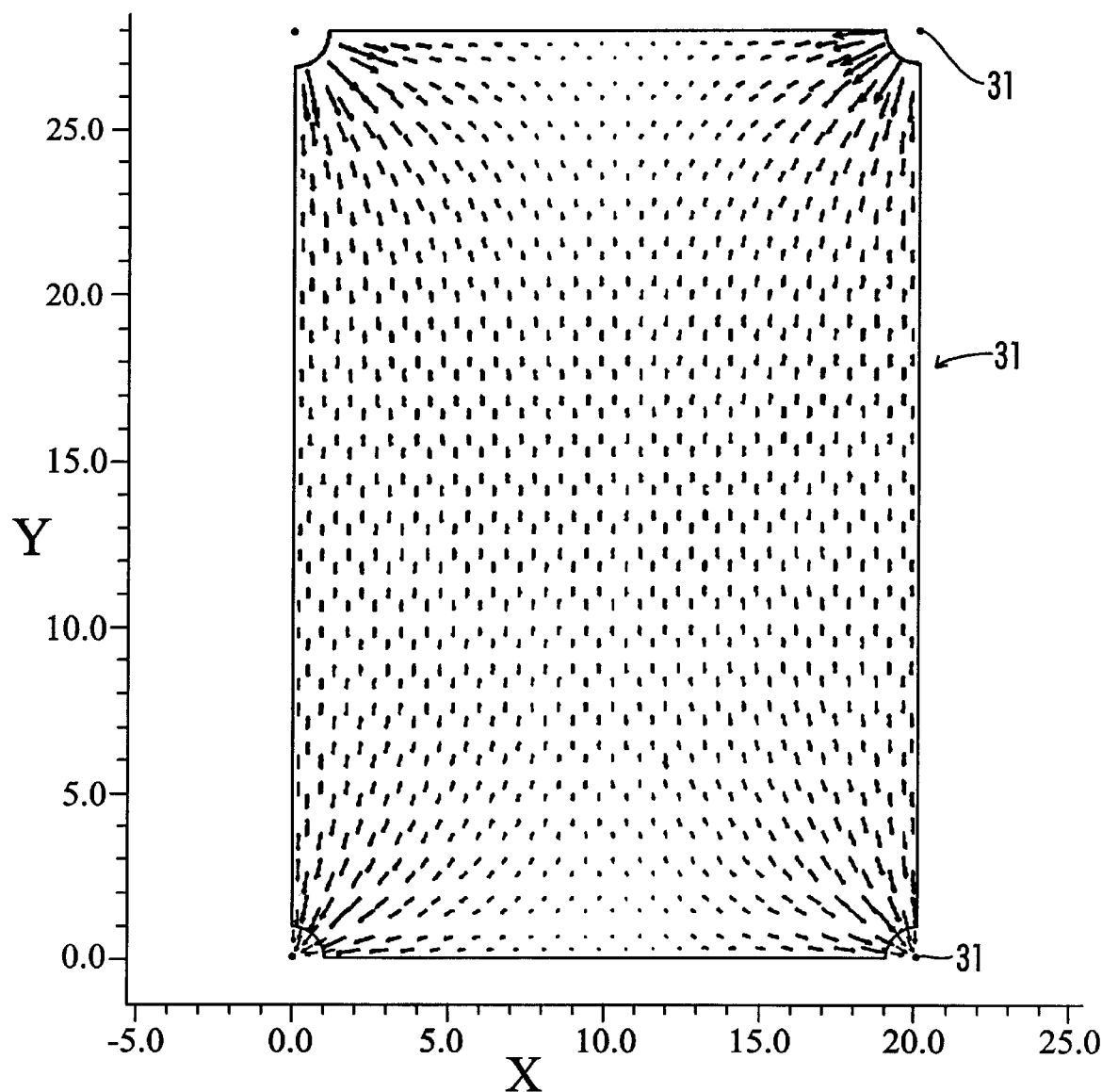
FIG. 3 shows a plot of current flow lines in a sensor having four electrodes at the corners.

FIGS. 2 and 3 show alternative ways of displaying the configuration of FIG. 1A: three-dimensional potential and current distributions, respectively. These are useful to further understand the distorted space of non-uniform potentials that occurs with the simplified electrode configuration.

Experiments approximating this model were done by making electrodes in the form of discs of 7-mm diameter (using highly conductive nickel paint) applied to electrically conductive paper. These intuitively designed experiments gave excellent results. Even for a line drawn less than 1 cm from the two electrodes (spaced about 20 cm apart) on the left of the figure, there was less than a factor of two variation in the electrical potentials as read with a digital voltmeter of high input impedance. At 2 cm from the electrodes this factor was reduced to 1.5 and at a distance of 4 cm, this factor was about 1.25. At the center of the 28-cm conductive paper this factor was about 1.0. Thus, while the equipotentials are far from vertical (along the y-axis) there is no region of the sensor that deviates from norm by more than a factor of two. There were no "insensitive" regions where a change in position would give essentially the same potentials.

Figure 9:
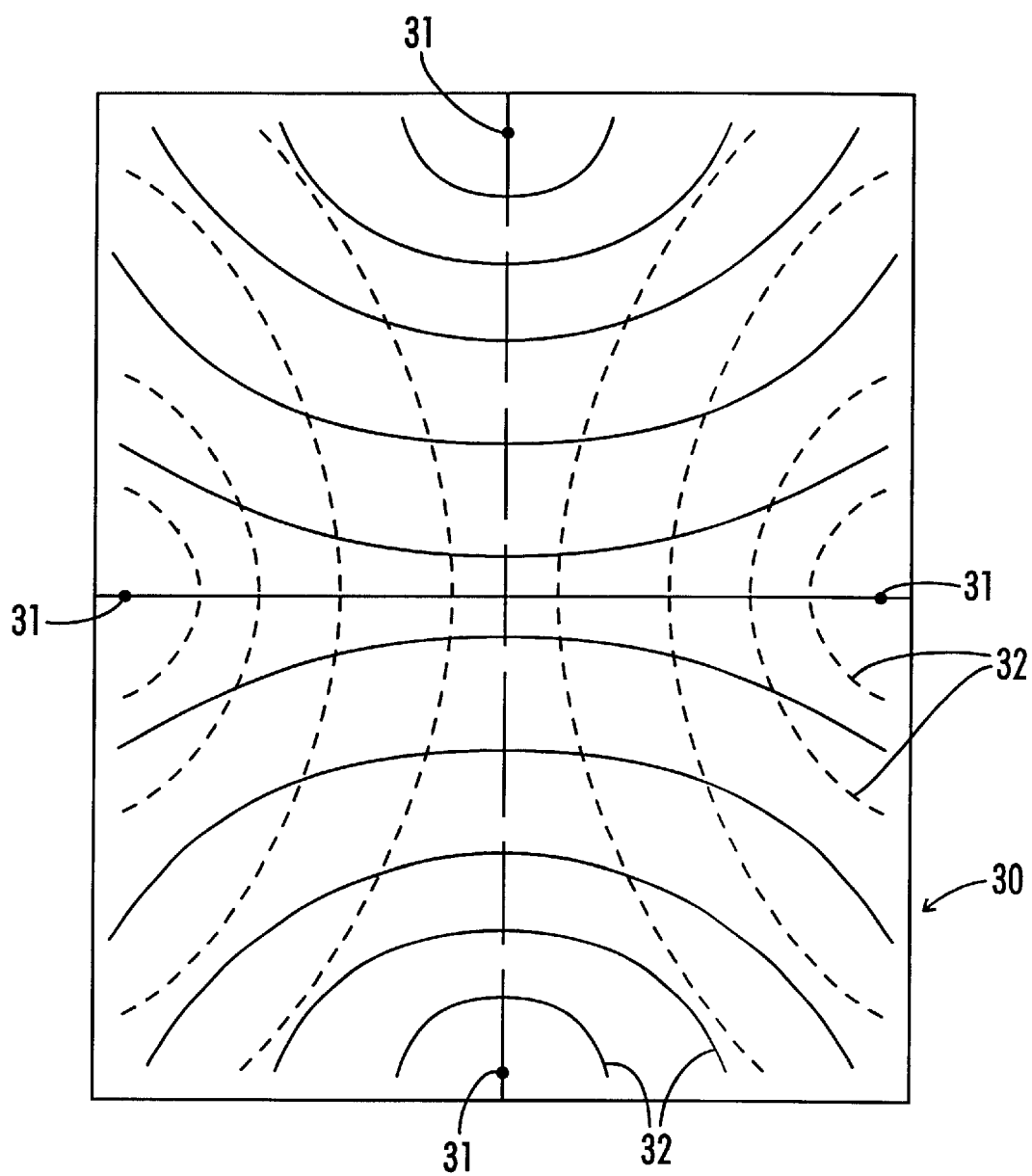
FIG. 9 illustrates a contour plot of theoretical equipotentials in a rectangular sensor with an electrode in the center of each side.

Another simple design was tested utilizing a single electrode at the center of the four edges of a rectangle. However, as shown in FIG. 9, actual potential measurements on this design revealed regions near each of the corners that were "insensitive" and therefore would not be a good touch screen design. This effect could be anticipated simply by looking at the equipotentials in the vicinity of the corners. In these regions the equipotentials spread out indicating that the electrical fields are weak in these regions in comparison with the central region.

In some designs the equipotential pair V(X,y) and V(Y,x) may not cross sufficiently for the determination of the point P(x,y). This tends to become a problem in the vicinity of the electrodes as FIGS. 1A and 1B show. Variation of electrode design can be used to solve this problem.

The examples illustrate an important point: it is quite easy to arrive at sensor designs where nearly all points on the planar surface can be characterized by a unique pair of potentials [V(X,y), V(Y,x)] and where the fields vary by less than a factor of two, so that all regions of the sensor can be regarded as responsive. Of course, these examples are far from exhaustive; the designs could be combined to have eight electrodes. The electrodes could be rectangles instead of circles, etc. There is great flexibility because we have liberated our design from the requirement of uniform electrical fields. Non-uniformity in the electrical fields may be due both to electrode designs and non-uniform coatings of the screen.

Figure 4:
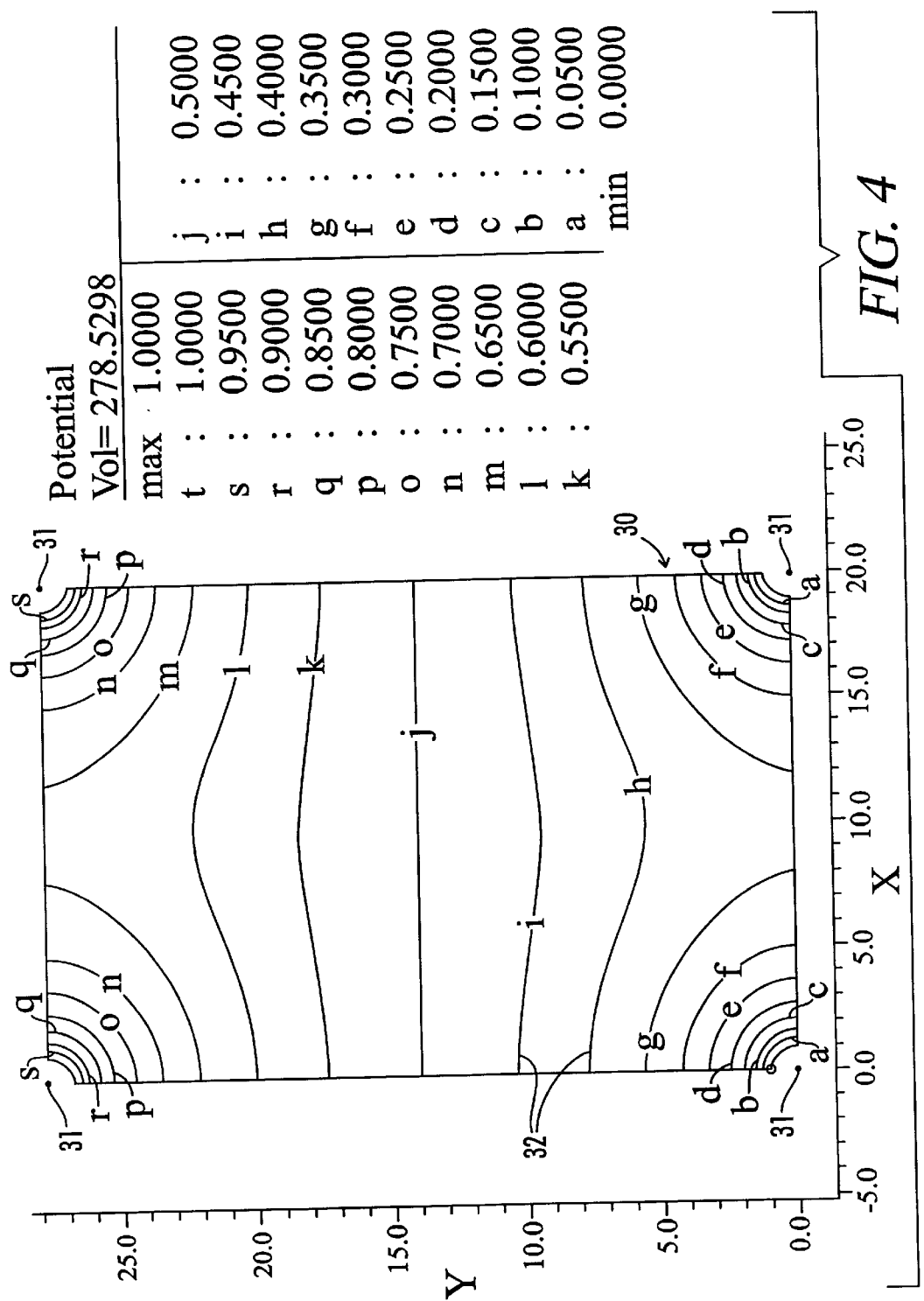
FIG. 4 illustrates a contour plot of theoretical equipotentials in a sensor with non-uniform conductivity to simulate conditions that might result from vacuum evaporation and deposits of the conductive substance.

If the conducting material has a non-uniform thickness, the potential will be affected by a non-constant $\delta(x,y)$ in Eq. (A3). For example, if $\delta(x,y)=\{1+0.01[(x-10)^2+(y-14^2)2]\}^{-1}$, then the conductivity at the center of the sheet is twice that on a circle of radius 10 cm and centered at the center of the sheet. Such a conductivity function might represent that generated in vacuum deposition of conducting material from a single source located over the center of the substrate. FIG. 4 shows a contour plot of the equipotentials for the same configuration as in FIG. 1A, but with the above spatially varying conductivity.

RESISTANCE FRAMING DESIGN

The electrode configurations disclosed in FIGS. 1–9 are very simple (for example a portion of a small circle at the four corners of a resistive sheet). These are generally satisfactory sensor designs when used under the umbrella of the topology mapping concepts. Over almost the entire area of the resistive surface, an equipotential pair, generated by the switching action of the controller, can be transformed to a unique Cartesian coordinate with suitable accuracy. However, in the vicinity of these electrodes there remains a problem of uniqueness; that is, equipotential pairs cannot be transformed to unique Cartesian coordinates. This results in regions around the electrodes that are not suitable as working area, an undesirable effect in today's highly competitive touch screen market.

It is helpful to elaborate on the uniqueness problem for the discussion that follows. If a circular electrode is polarized in the x-direction, equipotentials near the circle are circular and if polarized in the y-direction, these equipotentials are also circular. This means that in this small region near the electrodes each pair of equipotentials created at a particular point will not uniquely transform to a Cartesian coordinate. In other words, the complementary equipotentials fail to cross with an angle that is large enough to permit unique transformation in practice. This will be referred to as the "no-crossing" problem, and the regions where this occurs as the "no-crossing" region. Various electrode configurations that are not circular, such as L configurations, can be visualized to decrease the size of these "no-crossing" regions, but still the problem persists. To overcome the problem in its entirety and in a very general way independent of sensor geometry, the present invention provides a novel approach that uses a band of intermediate resistivity situated between the low resistivity of the electrodes themselves and the high resistivity of the working area.

Figure 10A:
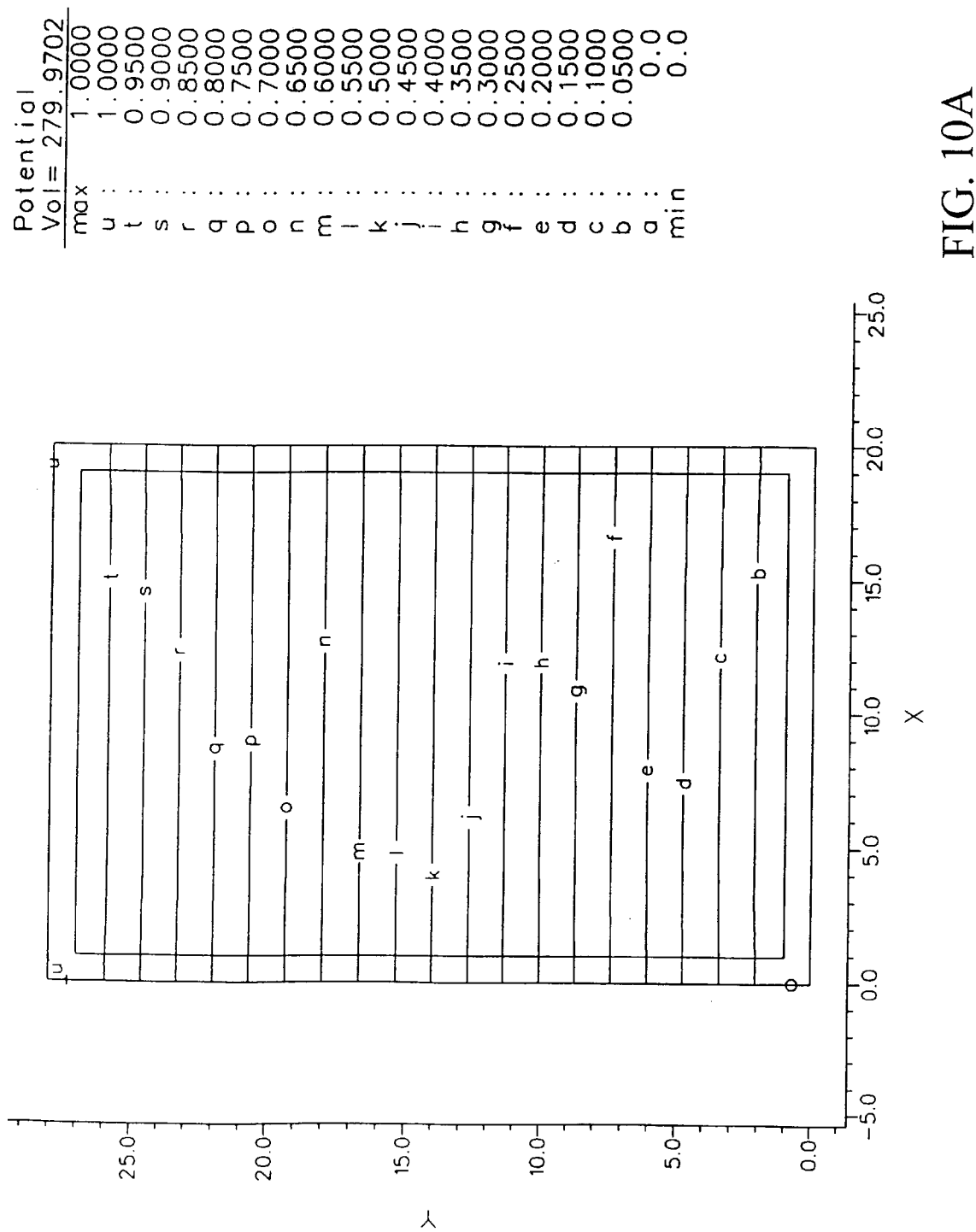
FIG. 10A is a representation of a set of equipotentials in a picture frame sensor configuration according to the present invention. The width of the frame is taken to be one unit in a 20×28 sensor and its conductivity is 1000 times that of the central sensor area. The electrodes at the four corners are L-shaped and each segment of the L is taken to have unit length. The applied potential of one unit is assumed between the top pair and the bottom pair of electrodes.
Figure 10B:
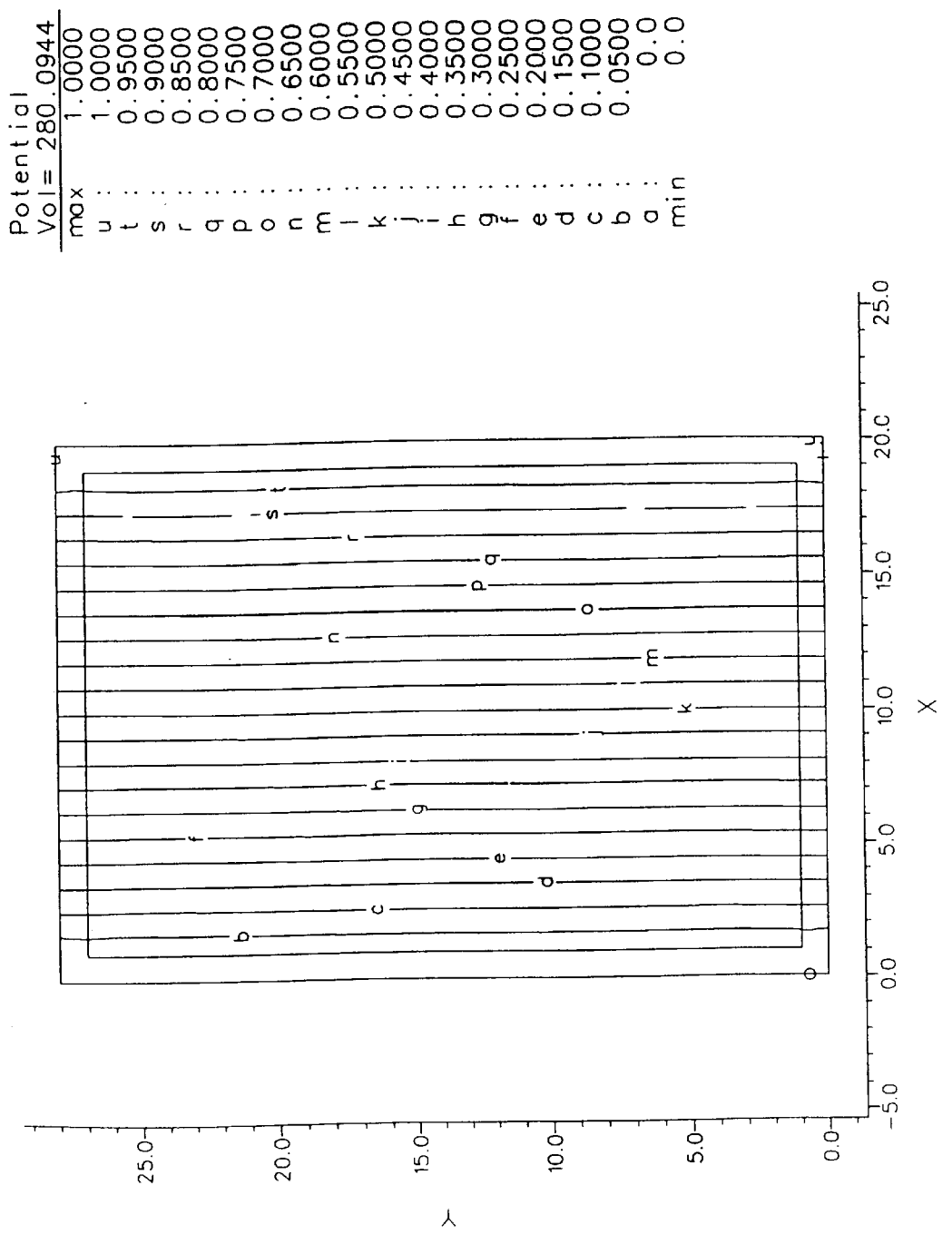
FIG. 10B is a depiction of the sensor counterpart of FIG. 10A, however, equipotentials for unit potential applied between the left pair and the right pair of electrodes.

Interesting sets of equipotentials are obtained by assuming that the sensor is surrounded by this frame of highly conducting material in electrical contact with the electrodes and with the sensor proper. The first example of this design used a picture frame border with a width of one unit and a conductivity 1000 times that of the rest of the sensor, where the overall dimensions of the entire assembly were taken to be 20×28 units. The conducting electrodes were taken to be flat and L-shaped and located at each of the four corners of the assembly. FIGS. 10A and 10B show that the equipotentials are remarkably parallel over the whole width of the assembly, even in the frame itself, within the accuracy of this calculation.

Figure 11A:
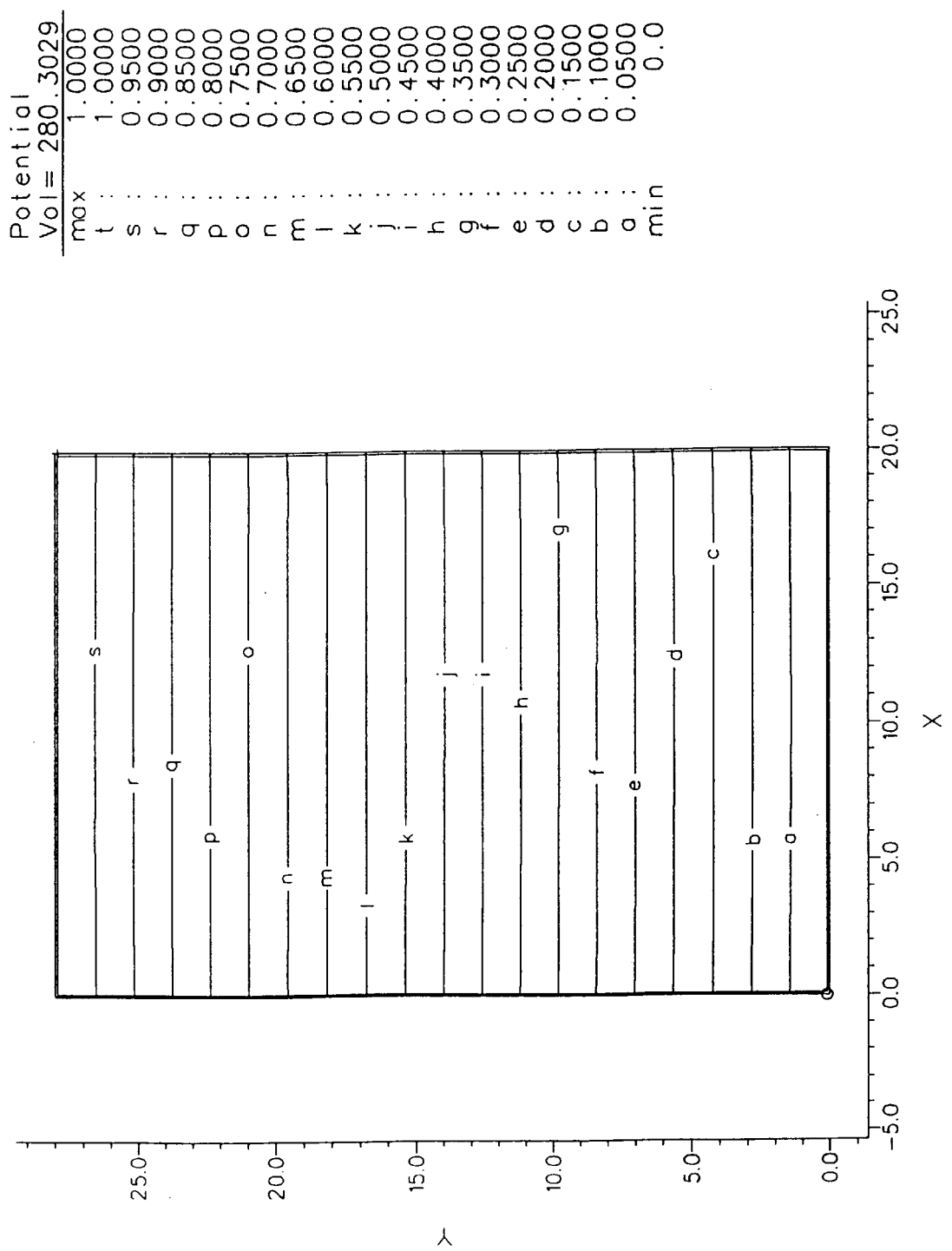
FIG. 11A shows equipotentials in the same sensor configuration of FIG. 10A except that the frame is taken to have a thickness of only 0.1 units, its conductivity is taken as 10,000 times that of the central area, and the L-electrodes are chosen to have length equal to that of the frame width.
Figure 11B:
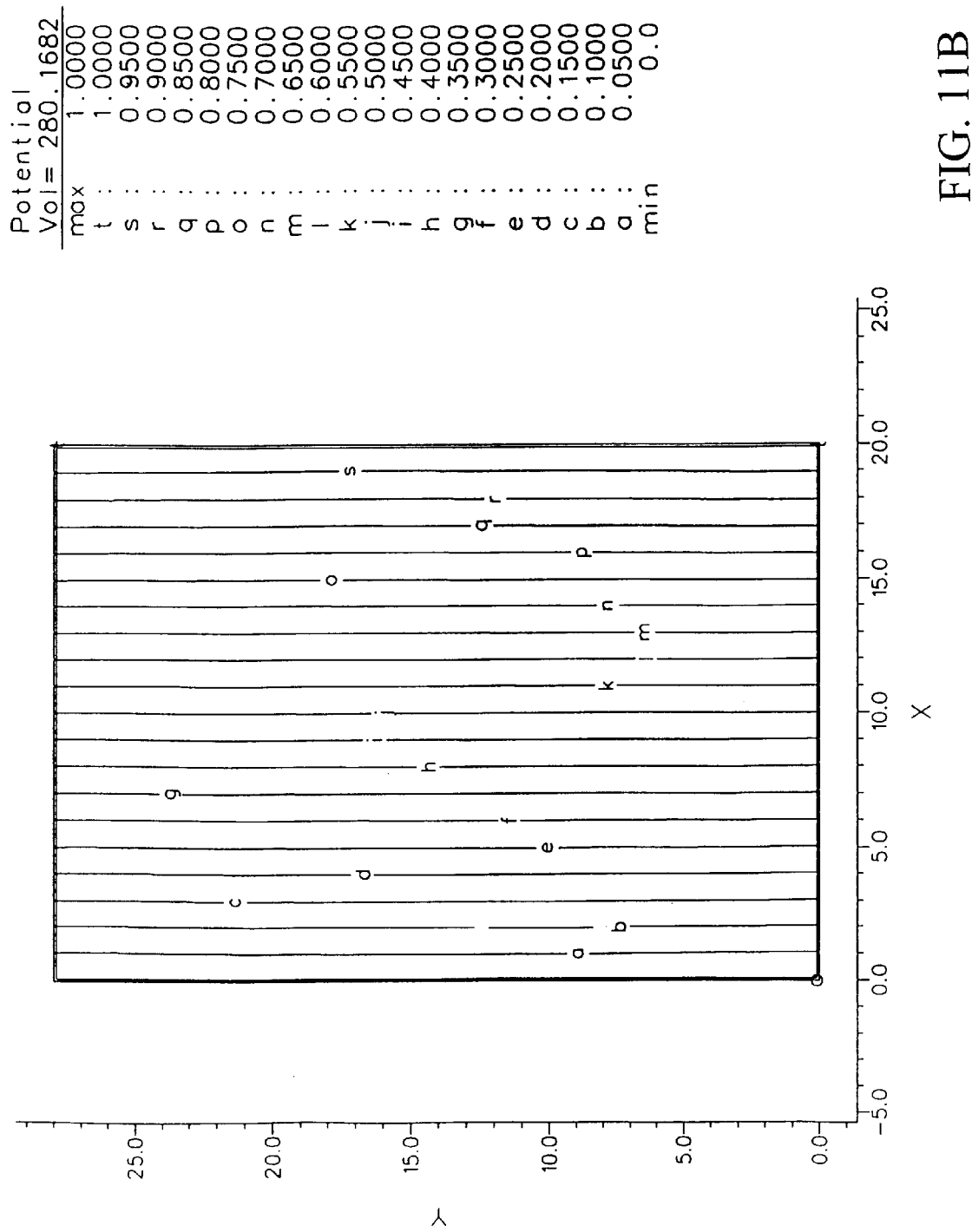
FIG. 11B is a depiction of the sensor configuration from FIG. 11A, however, the applied potential is taken in the x-direction between the left and right pairs of electrodes.

To investigate the effect of decreasing the width, w, of the conducting picture frame border, calculations were made in which the width was reduced by a factor of 10 and conductivity of the border was increased so that the product of conductivity and frame width was constant (to simulate pasting a potentiometer of low resistance around the rest of the working area). These results are shown in FIG. 11a and 11b, and again show remarkably parallel equipotentials. However, to avoid some edge distortion it is desirable to shorten the L-shaped corner electrodes so that their segment lengths are equal to w. Note that in some instances the actual width of the picture frame border is not critical. For example, if the thin, highly conducting frame material is transparent, the entire area of the assembly can be used as the sensor.

Figure 12A:
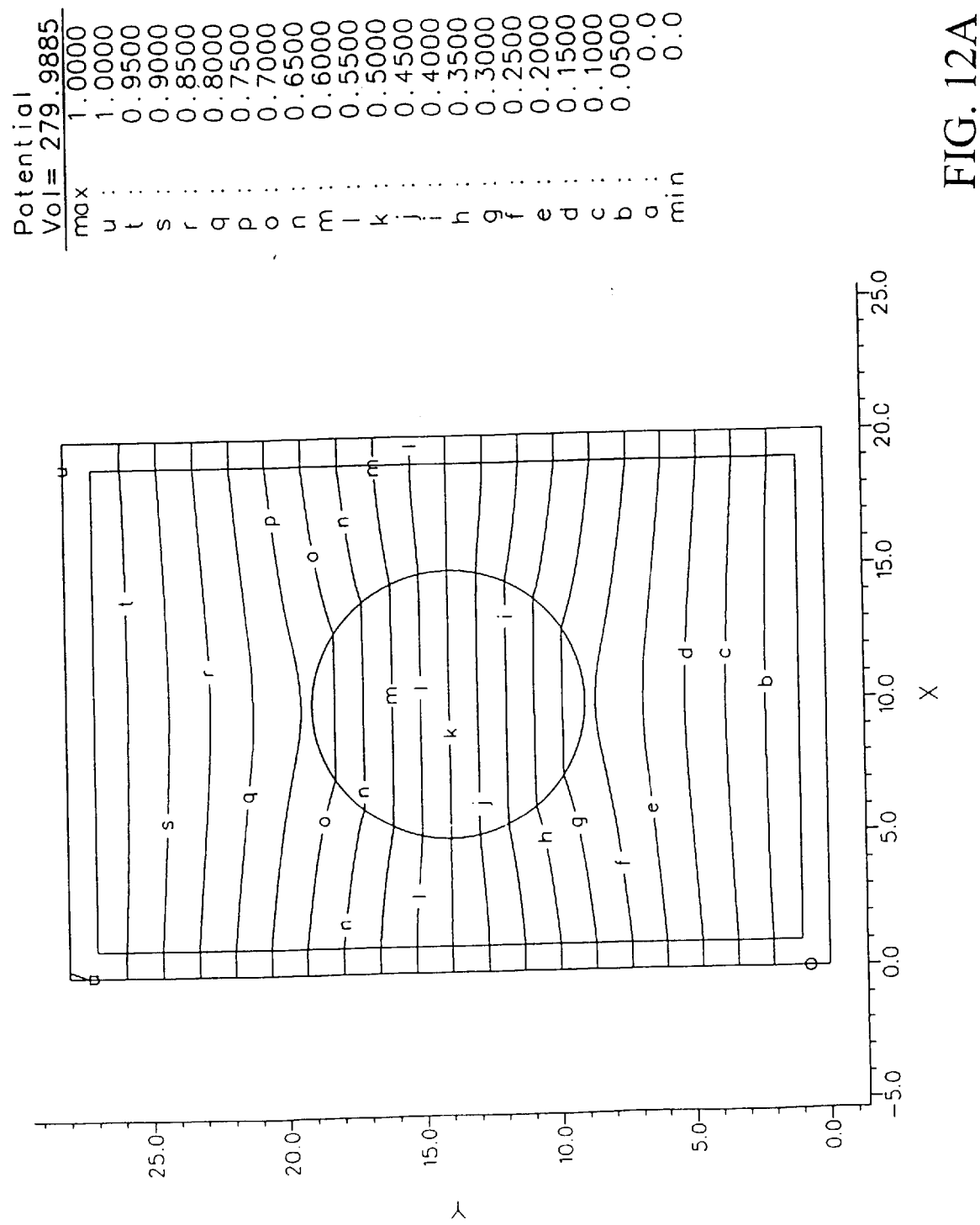
FIG. 12A shows equipotentials in the same sensor configuration as in FIG. 10A except that a circular region of 5 units radius located in the center of the sensor is taken to have conductivity of half that of the sensor. The potential is applied in the y-direction between the top and bottom pairs of electrodes.
Figure 12B:
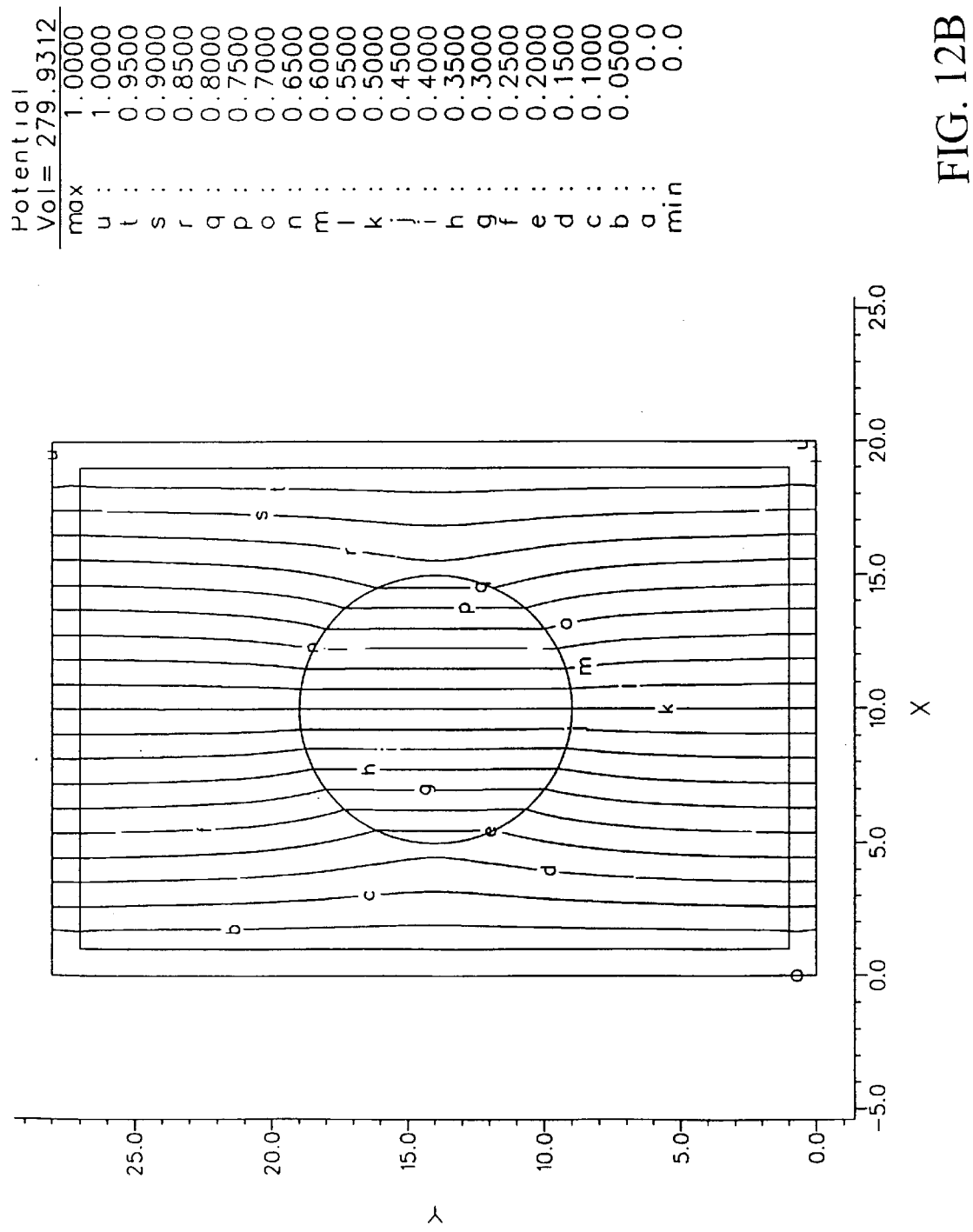
FIG. 12B shows the same sensor as in 12A except that the potential difference is applied in the x-direction between the left and right pairs of electrodes.

To see the effect of non-uniform conductivity in the body of the sensor, equipotential distributions were plotted in the same picture frame assembly used to obtain the results shown in FIGS. 10A and 10B, but with a circular region of radius 5 units having a conductivity of only half of that of the central sensor region. These results are depicted in FIG. 12A where there is appreciable distortion. FIG. 12B shows the same configuration, except that the electric field is along the x-axis.

Figure 13A:
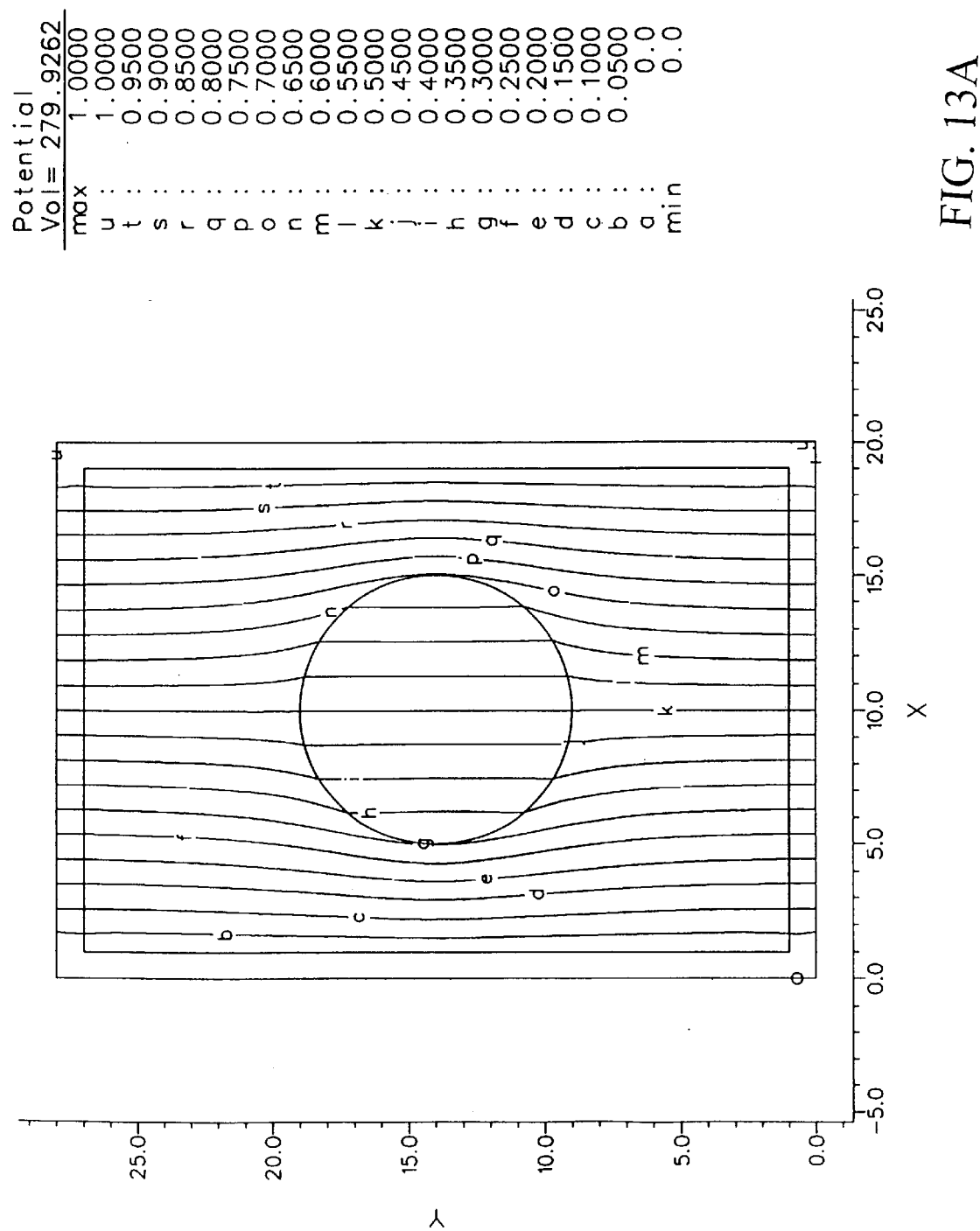
FIG. 13A shows equipotentials in the same sensor configuration as in FIG. 10B except that a circular region of 5 units radius located in the center of the sensor if taken to have conductivity of twice that of the sensor. The potential is applied in the x-direction between the left and right pairs of electrodes.
Figure 13B:
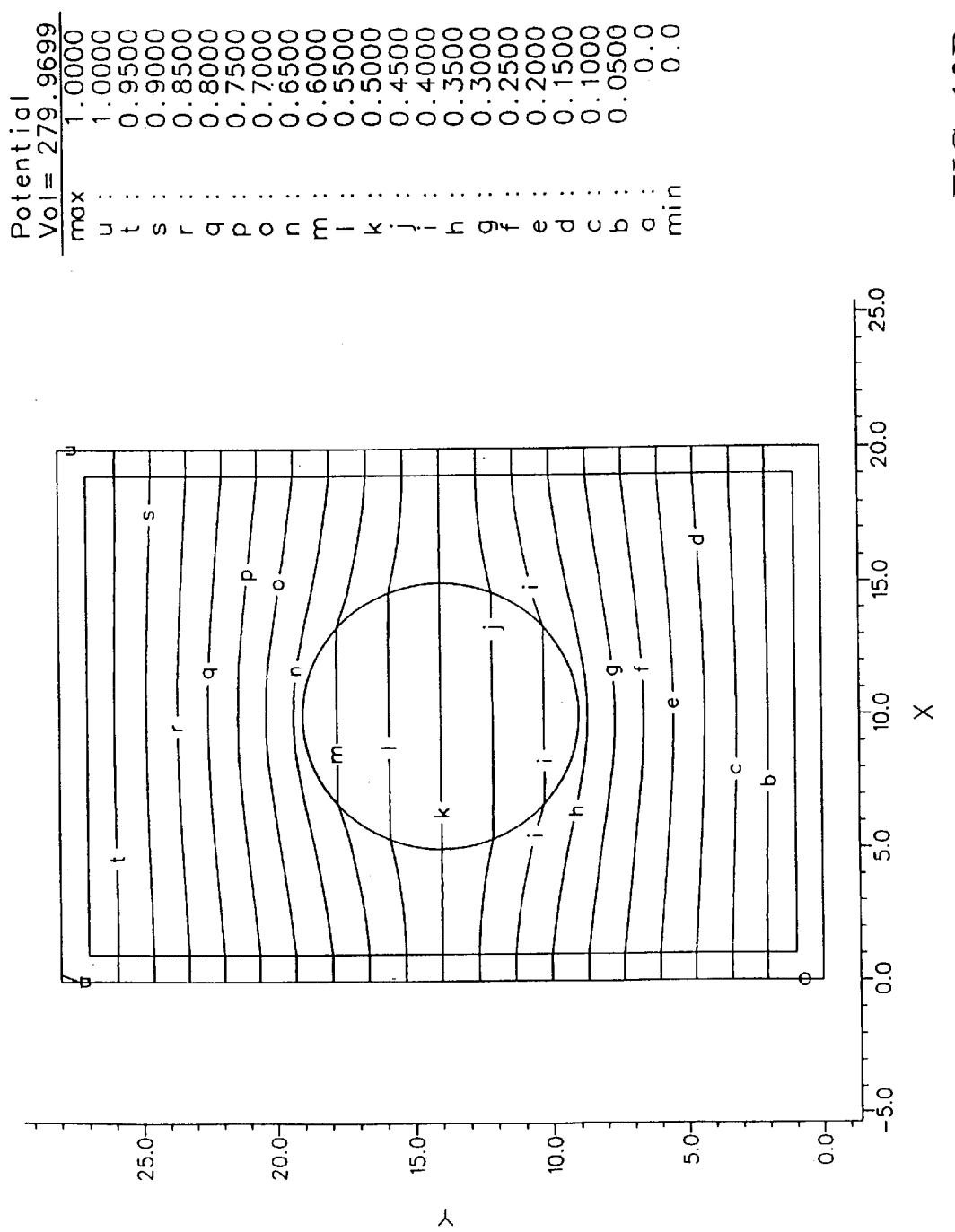
FIG. 13B shows the same sensor as in 13A except that the potential difference is applied in the y-direction between the top and bottom pairs of electrodes.

FIGS. 13A and 13B show similar distortions to FIGS. 12A and 12B where a circular region in the central sensor region is provided with a conductivity twice that of the remainder of the central sensor region. A reciprocally similar distortion to that shown in FIGS. 12A and 12B results.

Figure 14A:
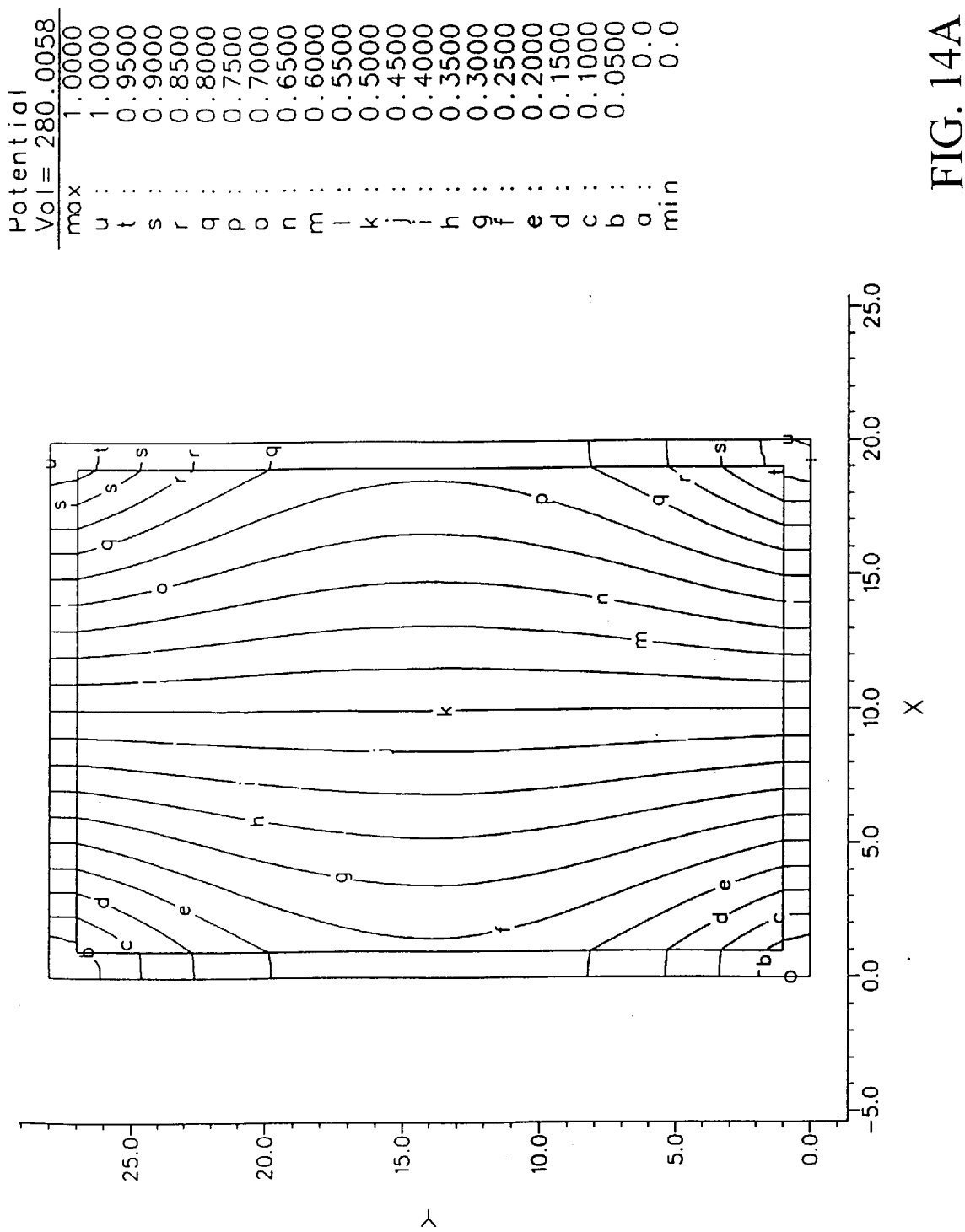
FIG. 14A is the same sensor configuration as FIG. 10A except that the conductivity of the frame is taken to be only 10 times that of the sensor center with a one unit wide frame in the standard 20×28 configuration. The electrodes are L-shaped with unit length segments. With this lower conductivity there is some non-uniformity.
Figure 14B:
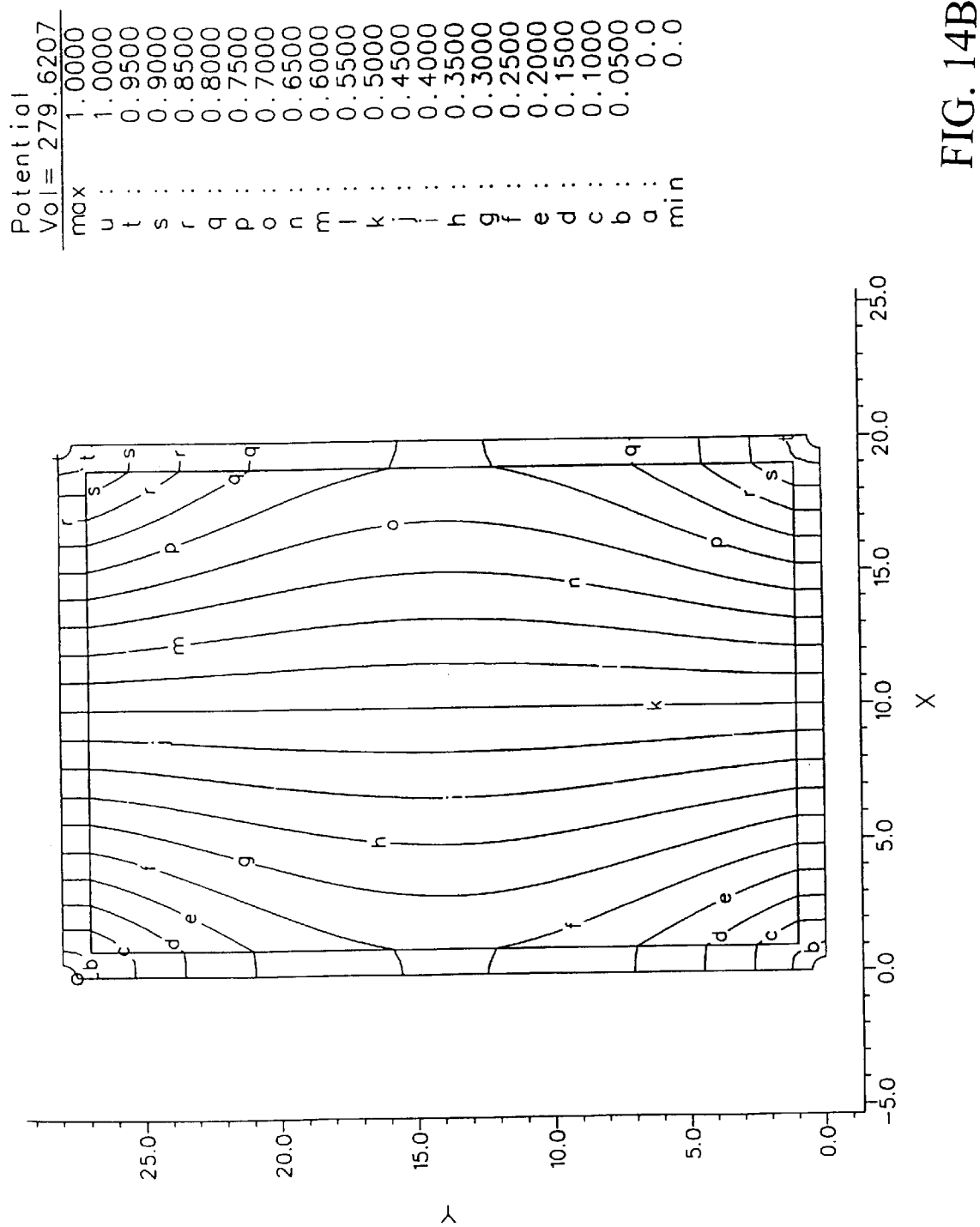
FIG. 14B shows equipotentials for the same configuration as in 14A, but with circular electrodes. Note that with this combination of frame thickness and conductivity, there is little difference in the equipotentials whether the corner electrodes are circular or L-shaped.
Figure 15A:
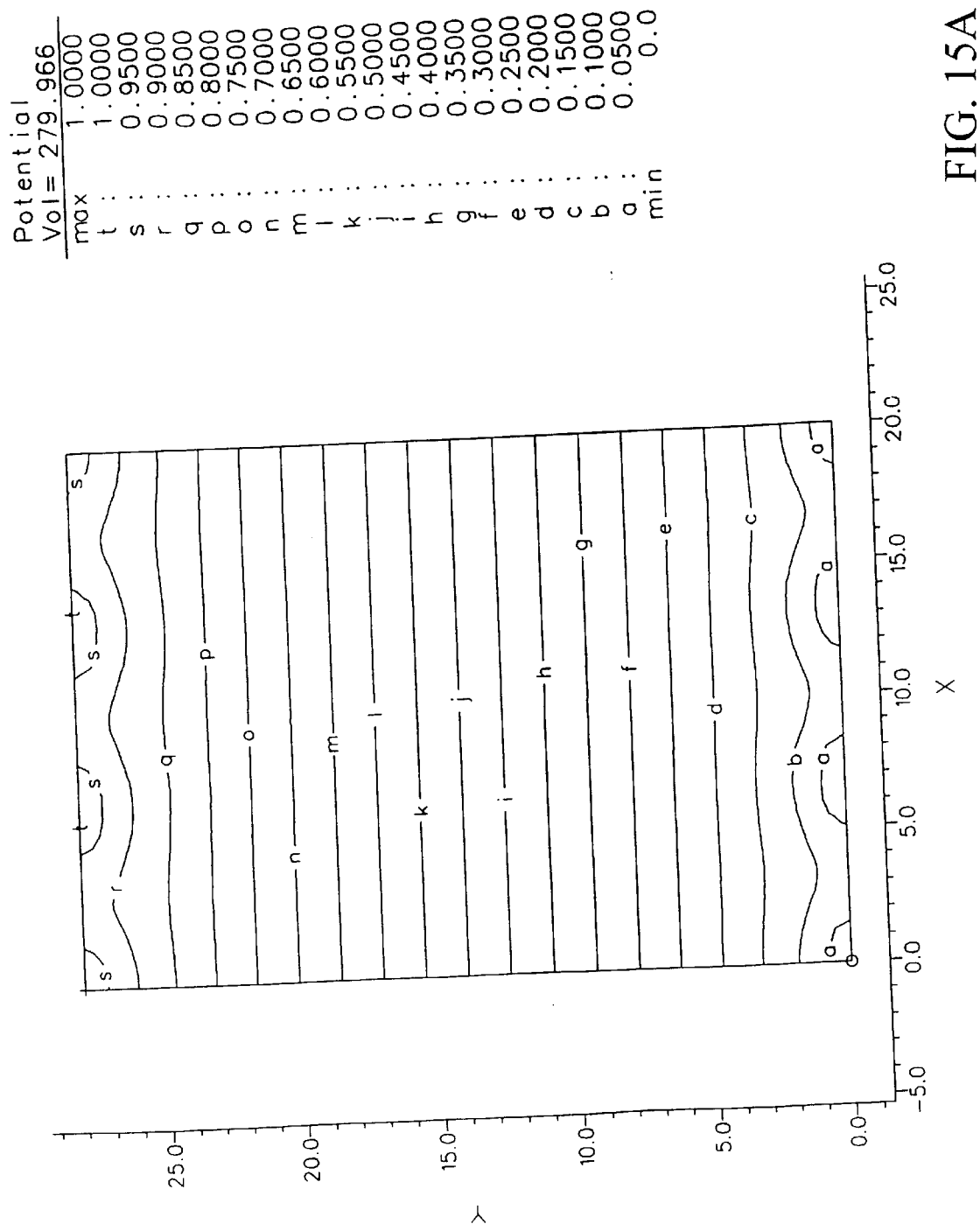
FIG. 15A shows equipotentials in the original uniform conductivity sensor of FIG. 1a with 12 flat, unit length electrodes distributed uniformly around the perimeter. L-shaped electrodes are at the corners, while electrodes on the sides are assumed to be held at potentials depending linearly on the distance from the corner pair that establish the potential difference.
Figure 15B:
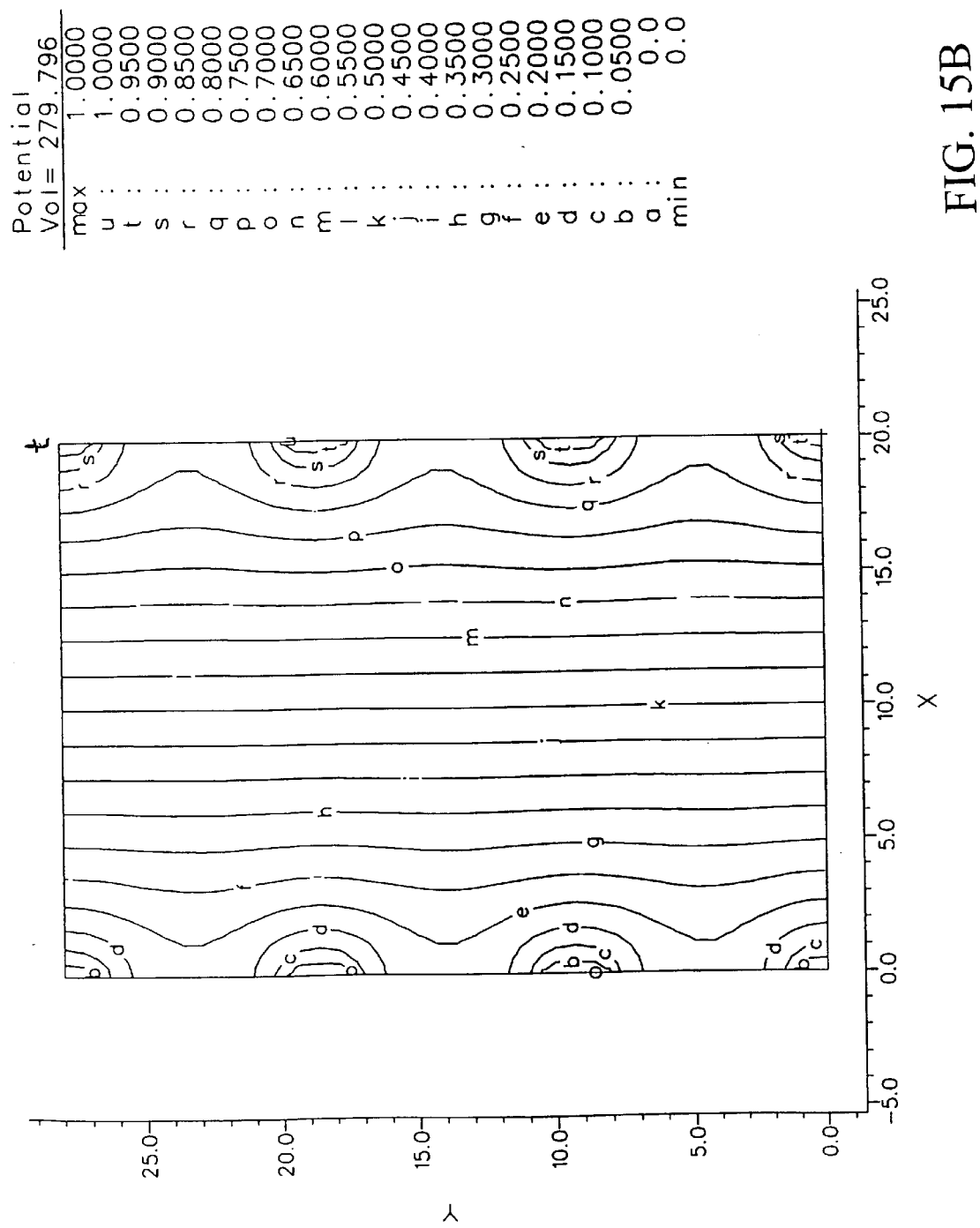
FIG. 15B shows equipotentials on the same sensor as in FIG. 15A except that the applied potential is in the x-direction between the left and right sets of electrodes. In this case the equipotentials are more nearly parallel except very near the electrodes and are a definite improvement over the equipotentials of FIGS. 1A and 1B.
Figure 16:
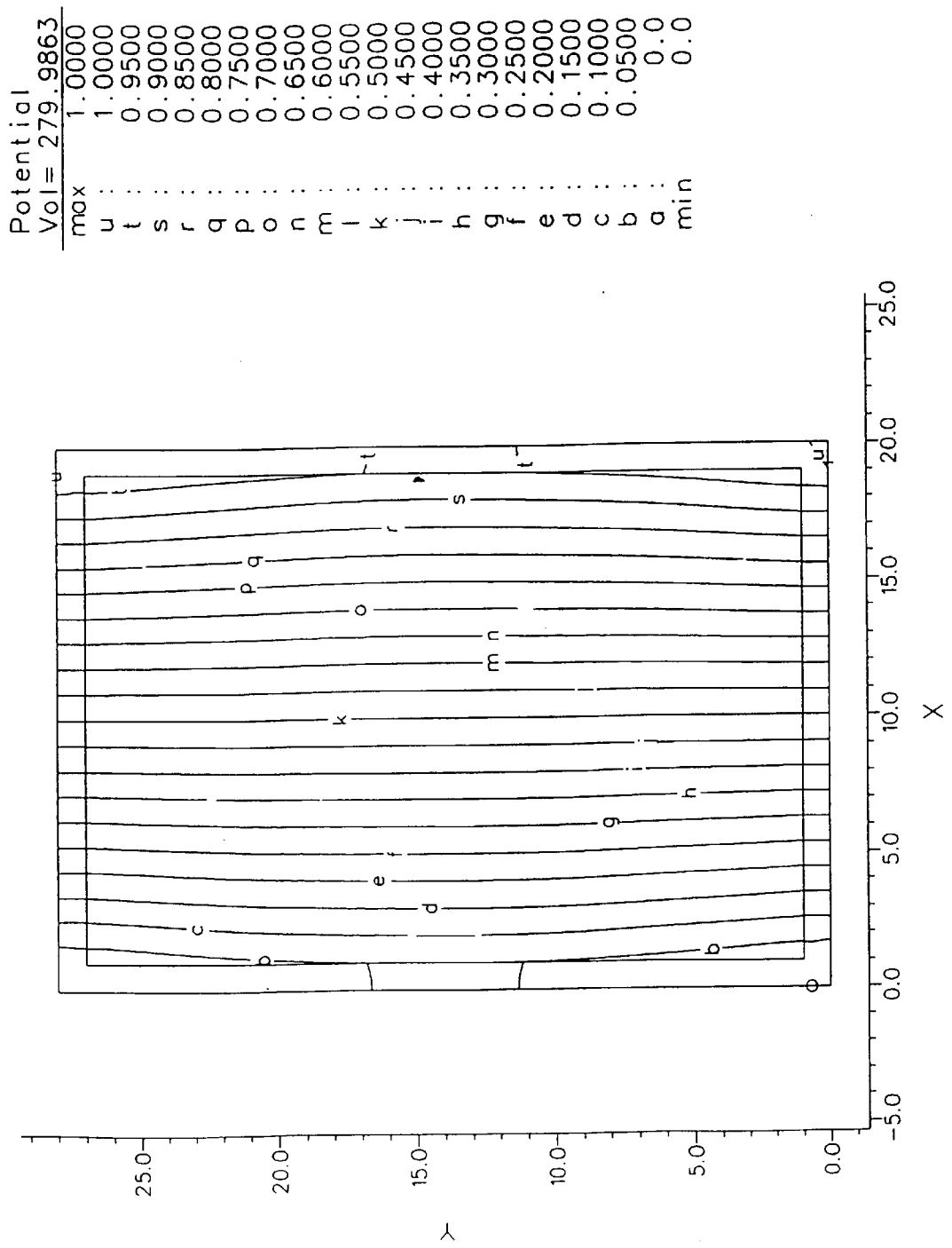
FIG. 16 shows equipotentials for the same configuration as shown in FIG. 14A, except that the conductivity of the frame is 100 times that of the sensor center. The equipotentials are more nearly parallel, easily handled using electronic controllers and data processing, as indicated in the text, but by increasing the conductivity still further by a factor of 10, as in FIG. 10, excellent parallelism is achieved.

FIGS. 14A and 14B show the results of the picture frame design when the conductivity of the frame portion is taken to be only 10 times the conductivity of the central sensor region. With lower conductivity some non-uniformity is obvious. In particular, FIGS. 14A and 14B contrasts the plot of equipotentials when the electrodes are varied from a L shape to a circular shape. With this combination of frame design and conductivity, the design of the corner electrodes appears to make very little difference in the equipotential plots. FIGS. 15A and 15B illustrate the equipotentials in a uniform conductivity sensor with 12 flat unit length electrodes distributed around the 96 unit perimeter of the sensor. This electrode design is a vast improvement over the corner electrode configuration of FIGS. 1A and 1B, however, there remain substantial non-uniformities near the electrodes. FIG. 16 shows equipotentials for the same configurations as FIGS. 10A and 14A except that the conductivity of the frame border is chosen to be 100 times that of this central sensor region as contrasted to the 1,000 conductivity ratio of FIG. 10A and the 10 times conductivity ratio of FIG. 14A. As might be expected, the equipotentials are more nearly parallel than those of FIG. 15A, but still show increased non-uniformity as compared to the equipotentials of FIG. 10A.

Figure 17:
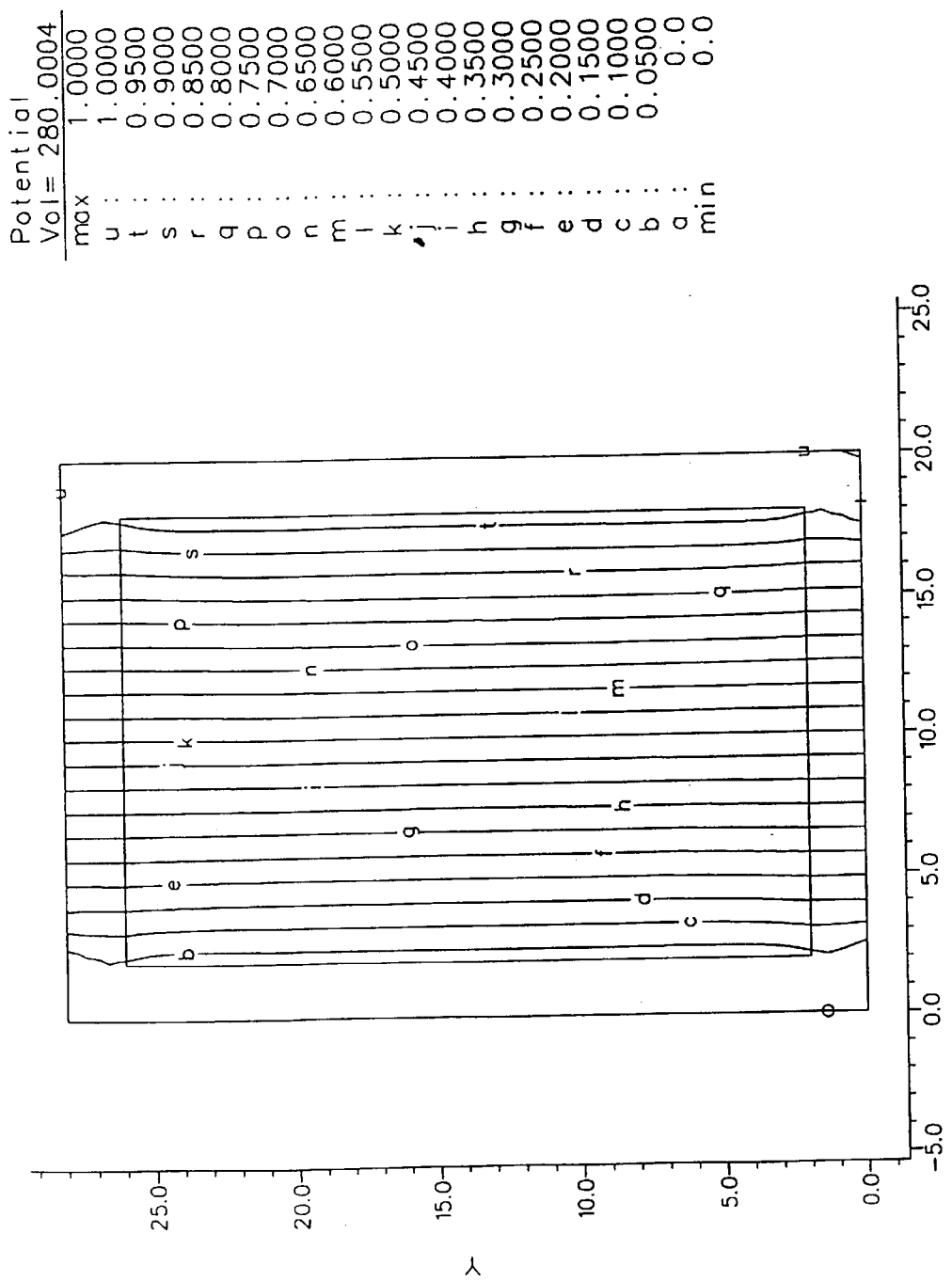
FIG. 17 shows equipotentials for a 20×28 picture frame screen with the perimeter frame regions 2 units wide, with L-electrodes 2 units wide and for conductivity of the frame 500 times that of the sensor center, in accord with the idea that the product of conductivity and frame width should remain constant.

Throughout the design of these various sensor configurations, it has been thought that the product of the width of the picture frame border and the additional conductivity of that border should remain constant. Accordingly, FIG. 17 shows a picture frame sensor with a perimeter frame region twice as wide as the frame of FIG. 10A, but with only half the conductivity. While this produces lines of equipotential which are very nearly uniform, the frame area itself is not as useful as a sensor region. The use of L-shaped corner electrodes with each leg of the L being commensurate in size to the width of the picture frame border achieves the most uniform electric field.

Overall, the resistance framed design for sensors has some remarkable advantages, especially when used with the topological mapping concept described above. Essentially all of the substrate area, even very close to the electrodes, is useful working area. In other words the uniqueness required in the topological mapping concept is provided for the entire screen area. The picture frame design solves the uniqueness problem in a very general way.

MANUFACTURE

Coatings. Returning now to the problem of achieving uniform electrical coatings over large areas, the present invention provides some interesting design considerations. Take the typical case where a coating chamber is of limited size with interior dimensions that are not much larger than the substrates themselves. In this case, the corner regions of the substrates tend to receive a thinner coating than the central portions. This certainly would be the case if there were only a single source of the coating material located at some distance away from the center of the substrate.

The design of FIG. 1A and FIG. 1B would give partial compensation of this problem of irregular conductivity. That is, the equipotentials could become straighter in the corners due to the higher resistivity in these regions! (Conversely, designs with electrodes in the middle of the sides would only exacerbate the problem.) With the topological mapping concept of this invention, it is entirely possible that coatings from small evaporators (that are currently unusable) would even be preferable to those of more uniformity. Additionally, less stringent requirements upon coating uniformity could allow economical manufacture with simpler in-house equipment rather than using specialized out-sourcing.

With the used of the resistance framing design, it is relatively simple to achieve a unique mapping to compensate for non-uniformities in conductivity. Therefore use of the topological mapping technique that incorporates the resistance framing design provides a powerful tool to simplify and relax the manufacturing requirements for sensors, especially in the preparation of the conductive coatings.

Hardware for complete mapping. A convenient scheme for complete mapping is to use a decoding integrated circuit to convert equipotential readings. Chips are already manufactured very economically that provide this function for 256×256 and higher screen resolutions. Such a chip can be combined with the existing electronic sensing circuit to convert a pair of readings, one corresponding to V(X,y) and the other to V(Y,x), to their corresponding Cartesian space coordinates. Specific examples for various screen resolutions follow.

For a screen with a resolution of 256×256, the raw data in potential space will consist of two 8-bit measurements. To convert these, a LUT memory component is needed which will accept two 8-bit addresses that point to two 8-bit values that have been previously loaded during calibration. Chips are available as programmable read-only memory (PROM) or erasable-PROM (EPROM).

The Am27C1024 is a 1-megabit (65,536×16-bit) CMOS EPROM that meets the requirements for 256×256 resolution. This component is readily available from its manufacturer, AMD, or from a distributor such as Hamilton Hallmark. Typical power consumption is only 125 milliwatts in active mode and only 100 microwatts in standby mode. Only 8 seconds are needed to program the component while look-ups can be performed in 55 nanoseconds.

For a screen with a resolution of 512×512, the raw data in potential space will consist of two 9-bit measurements one corresponding to V(X,y) and the other to V(Y,x). To convert these into comparable Cartesian space, a LUT component is needed which will accept two 9-bit addresses that point to two 9-bit values that have been experimentally determined during calibration.

The Am27C4096 is a 4-megabit (262,144×16-bit) CMOS EPROM that meets the requirements for 512×512 resolution. This component is readily available from its manufacturer, AMD, or from a distributor such as Hamilton Hallmark. Typical power consumption is only 125 milliwatts in active mode and only 125 microwatts in standby mode. Only 32 seconds are needed to program the component while look-ups can be performed in 90 nanoseconds.

Both of the components cited above can be purchased in either a package with a ceramic window permitting erasure via ultraviolet light (and thus reprogramming) or in a sealed package for one-time programming. The one-time programmable part has the advantage of being slightly cheaper but the re-programmable part has the advantage of allowing re-calibration after some period of customer use.

For a screen with a resolution of 1024×1024 or higher, multiple LUT memory components can be used or a single-package component can be custom designed specifically for this purpose. There is an initial non-recurring engineering expense involved for a custom component but its piece price would likely be less than two EPROMs. Therefore, this approach might prove more cost-effective if 100,000 or more parts are needed. Development of a custom VLSI chip may be justified whenever the quantity of parts needed is sufficient to amortize the one-time engineering effort.

The contents of the custom component may consist of either full LUT memory just like the EPROMs or a reduced number of memory locations and some associated calculation logic. The exact balance of these resources is dictated by the resolution desired and the area required for logic versus that required for memory.

Calibration. The screen-response calibration can be determined either empirically, theoretically, or by a combination of both. A purely theoretical approach presupposes a model geometry and a particular screen-conductivity distribution such as detailed in the particular example used to describe Laplace's equation and would ignore variances that occur in manufacture. A purely empirical approach would involve pressing the screen in a pattern of points to generate all the values that transform potentials into useful coordinates. This latter approach would automatically account for variances but may be too slow or labor-intensive to be cost-effective. The combination approach would determine the transformation data for a number of points and interpolate the rest based upon theory.

Calibration values could be determined on an individual basis for each screen or each screen-lot manufactured. Thus, the component would be personalized to correspond to the coating of a particular screen and many non-uniformities, distortions and manufacturing defects would be compensated, producing much higher screen yields at significantly reduced cost.

An example of screen calibration compatible with economical production involves manually or robotically touching a grid of points on each screen and interpolating using a computer. The computer uses data generated by touching the grid points in a theoretical analysis. The Cartesian set of transformation values is generated by the computer and "burned" into the LUT stored in the PROM or EPROM. The number of points is determined by the resolution desired and the amount and kind of manufacturing defects. The program may also indicate defects in a screen and possibly highlight the positions of a few additional points that could immediately be touched. A refined calibration set can then be generated. As a result, quality control is automatic while rejects are reduced.

Figure 18:
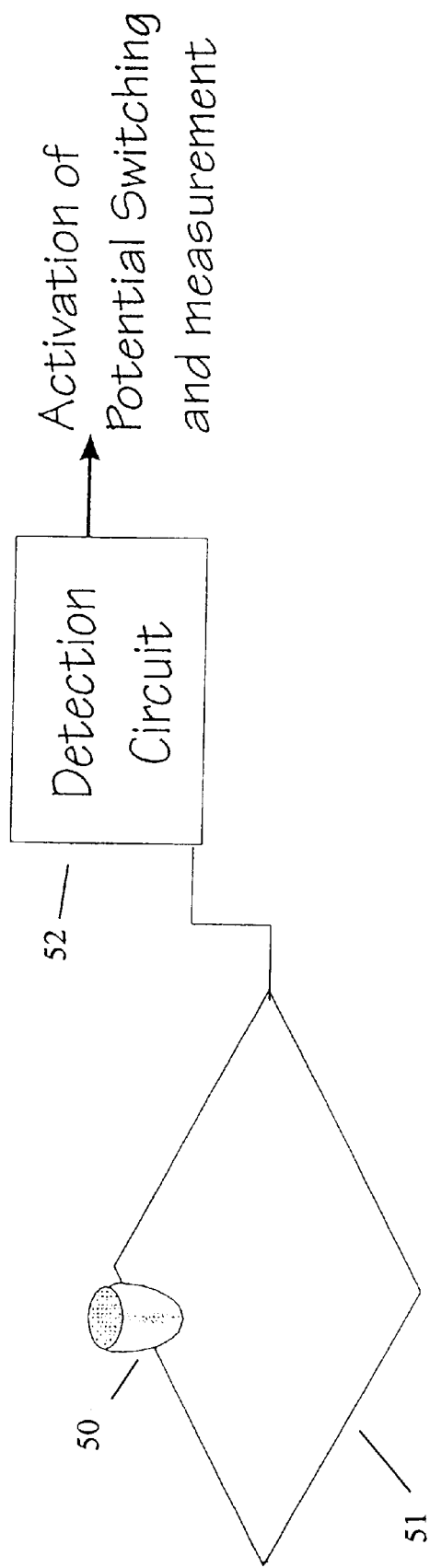
FIG. 18 shows a simple schematic diagram of a touch-down detector that may be advantageously employed to reduce power consumption.

Touchdown detection. Since many touch screen applications may be power sensitive, as in the example of battery operated devices, it is helpful to conserve power when the screen is not in use. A simple detection circuit is illustrated in FIG. 18. When the circuit is closed by a touch on the screen, the detection circuit activates the potential switching and measuring functions of the sensor. Virtually no power would be consumed except during brief measurement intervals. Without power conservation techniques, the resistive frame design could be limited to high resistivity screens. Consider, for instance, a touch screen with a resistivity of 2000 ohms/square and a resistive frame of 2 ohms/square. The resistance of a portion of a frame that is 10 inches long and 0.1 inch wide would be 200 ohms and the entire sensor would have a resistance of about 100 ohms, thus with a 5 volt supply the current drawn would be 50 milliamperes. Assuming that only 50 milliampere-hours can be dedicated to a touch screen, the useful battery lifetime in continuous operation is only 1 hour. However, with a touchdown detector the average current drain is very low and there is no significant battery limitation. For example, if a touch screen were used on the average of one time per second in a 10 microsecond cycle, then the 50 milliampere hours allocated to the touch screen could suffice, theoretically, for 100,000 hours.

SUMMARY

The present invention liberates the design of sensors for touch screen applications, offers considerable simplifications, and retains high quality. Several versions of the concept have been explored in which a space is defined by measurement of a potential pair on a surface with electric fields applied sequentially in two general directions. Acceptance of some distortion of this space, with respect to a perfect Cartesian space, is the key to simplicity and freedom of sensor design. This distortion poses no fundamental limitations, since the potential-pair space can be uniquely mapped onto a Cartesian space using the principles of topology. Complete mapping would use an auxiliary computer of adequate storage for the number of desired pixels.

In some "menu" applications, complete mapping with auxiliary equipment is not required. Mapping of a distorted equipotential space to a rectangular box can be made in a technique involving boundary analysis. When boundary mapping is made along the perimeter of a function box, an auxiliary computer is not necessary, since little storage space is needed for the definition of boundaries.

Sensor designs that insure topological equivalence between equipotential space and Cartesian space make use of a simple frame (as in a picture frame) of intermediate conductivity situated between very highly conducting electrodes and the low conductivity surface of the touch screen. Sensor production costs are greatly reduced by the resistance framing design used with the topological mapping inventions, and these sensors are not adversely affected by using this design.

The small distortions near the edges of a narrow frame sensor and any additional distortions due to non-uniformity of the sensor surface are easily handled with the topological mapping invention. In fact, the amount of correction, compared to sensors built without the frame, is very small. This means that the non-linear corrections can be made with smaller amounts of computer memory.

Wide frame borders may be used in sensors with only minor edge distortions. If the frame is transparent the frame itself can be used as an active part of the sensor. In some cases it may be possible to make satisfactory sensors with no electronic data corrections. In this case, one may view the picture frame border simply as a universal fritt, eliminating many steps in present sensor fabrication, but still requiring uniform depositions.

Studies of electrode-sensor configurations indicated features that lead to nearly uniform equipotential distributions. Additional figures and their captions document some of these studies. In general, narrow, high-conductivity frames with narrow, L-shaped electrodes at the corners seem quite useful in this work. The results provided by the resistance framed sensor are so favorable that this design may be used without additional resistive or insulating elements.

Thus, there are many options for the broad principle—topological mapping of potential pairs to real space. Regardless of the option used, it is believed that the overall cost of touch screen production is considerably reduced without the loss of any quality, compared to existing technology. At the same time, new designs can be implemented without excessive engineering efforts, especially with the resistance framed sensor concept. The combination of design freedom and the much-reduced production costs should impact the industry in a positive way; especially since there are markets, such as education and home entertainment, that cannot be penetrated with the price structure of existing technology.

Numerous alterations of the structure herein described will suggest themselves to those skilled in the art. It will be understood that the details and arrangements of the parts that have been described and illustrated in order to explain the nature of the invention are not to be construed as any limitation of the invention. All such alterations which do not depart from the spirit of the invention are intended to be included within the scope of the appended claims.

We claim:

1. A touchscreen system comprising:
   (a) a rectangular electrically conductive area;
   (b) a cover sheet positioned over an exterior surface of the electrically conductive area;
   (c) a complete set of four electrodes, one of the electrodes attached to each corner of the electrically conductive area and connected to an electrical power source;
   (d) a band applied to the substrate and framing the electrically conductive area having a conductivity within a range that enables unique non-linear mapping from electrical measurements made on a surface of the cover sheet to a set of Cartesian coordinates;
   (e) an electric circuit that measures a potential of a selected point on the conductive area when brought into contact therewith;
   (f) a controller that sequentially switches electrical potential from the power source to a first subset of said electrodes thereby establishing a first non-uniform electrical potential distribution on the conductive area, and then to a second subset of said electrodes thereby establishing a second electrical potential distribution on the conductive area; and
   (g) a processor that processes each set of potential measurements of said first and second electrical potential distributions from the electric circuit and uses an electrical measurement from each of the first and second electrical potential distributions corresponding to the selected point to perform unique non-linear mapping to determine a location of the selected point.

2. The sensor of claim 1 wherein the band of intermediate conductivity is transparent.

3. The sensor of claim 1 herein the band of intermediate conductivity is in the range from about 10 to about 10,000 times more conductive than the electrically conductive area.

4. The sensor of claim 1 wherein at least one electrode is circular in shape.

5. The sensor of claim 1 wherein at least one electrode is L-shaped.

6. The sensor of claim 1 wherein at least one electrode comprises two or more linear segments and electric potential may be applied to each segment.

7. The sensor of claim 1 wherein at least one electrode comprises a plurality of dots and electric potential may be applied to each dot.

8. The sensor of claim 1 wherein the band of intermediate conductivity is transparent.

9. A touchscreen having a transparent substrate completely coated with an electrically conductive material thereby providing a generally rectangular conductive area having a conductivity, the touchscreen comprising:
   a complete set of four electrodes, one of the electrodes positioned at each corner of the conductive area; and
   a discrete rectangular band including four strips applied to the substrate, each strip electrically coupled to the electrodes and the conductive area, each strip having a substantially uniform width and a conductivity, the band framing the electrically conductive area, wherein a ratio of the band conductivity to the conductive area conductivity multiplied by a ratio of the band strip width to the conductive area dimension measured in the same direction as the band strip width is greater than 0.25 and less than 10.

10. The touchscreen as recited in claim 9, further comprising a transparent coversheet proximate to an exterior surface of the substrate.

11. A touchscreen system comprising:
    a touchscreen having a transparent substrate completely coated with an electrically conductive material thereby providing a generally rectangular conductive area having a conductivity, the touchscreen comprising:
    a complete set of four electrodes, one of the electrodes positioned at each corner of the conductive area; and
    a discrete rectangular band including four strips applied to the substrate, each strip electrically coupled to the electrodes and the conductive area, each strip having a substantially uniform width and a conductivity, the band framing the electrically conductive area, wherein a ratio of the band conductivity to the conductive area conductivity multiplied by a ratio of the band strip width to the conductive area dimension measured in the same direction as the band strip width is greater than 0.25 and less than 10; and an electric circuit that measures a potential of a selected point on the conductive area when brought into contact therewith;

a controller that sequentially switches electrical potential from the power source to a first subset of said electrodes thereby establishing a first non-uniform electrical potential distribution on the conductive area, and then to a second subset of said electrodes thereby establishing a second electrical potential distribution on the conductive area; and a processor that processes each set of potential measurements of said first and second electrical potential distributions from the electric circuit and uses an electrical measurement from each of the first and second electrical potential distributions corresponding to the selected point to perform unique non-linear mapping to determine a location of the selected point.

* * * * *

UNITED STATES PATENT AND TRADEMARK OFFICE
CERTIFICATE OF CORRECTION

PATENT NO. : 6,650,319 B1  
APPLICATION NO. : 09/262909  
DATED : November 18, 2003  
INVENTOR(S) : Hurst et al.

Page 1 of 1

It is certified that error appears in the above-identified patent and that said Letters Patent is hereby corrected as shown below:

On the Title page,
Item (60) Related U.S. Application Data, after "Provisional application No. 60/079,063, filed on Mar. 12, 1998," insert --PCT application No. PCT/US97/20001, filed on Oct. 29, 1997,--.

Signed and Sealed this
Twenty-sixth Day of February, 2013

Teresa Stanek Rea
*Acting Director of the United States Patent and Trademark Office*